(12) United States Patent
Ackerman et al.

(10) Patent No.: US 12,592,029 B2
(45) Date of Patent: Mar. 31, 2026

(54) SYSTEMS AND METHODS FOR MEDIA CONTENT GENERATION

(71) Applicant: Accenture Global Solutions Limited, Dublin (IE)

(72) Inventors: Jordan Alexander Ackerman, San Francisco, CA (US); Michael Kuniavsky, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 119 days.

(21) Appl. No.: 18/412,317

(22) Filed: Jan. 12, 2024

(65) Prior Publication Data

US 2024/0242427 A1     Jul. 18, 2024

Related U.S. Application Data

(60) Provisional application No. 63/438,998, filed on Jan. 13, 2023.

(51) Int. Cl.
| | |
|---|---|
| *G06T 17/00* | (2006.01) |
| *G06F 40/166* | (2020.01) |
| *G06F 40/40* | (2020.01) |
| *G06T 19/20* | (2011.01) |

(52) U.S. Cl.
CPC ............ *G06T 17/00* (2013.01); *G06F 40/166* (2020.01); *G06F 40/40* (2020.01); *G06T 19/20* (2013.01); *G06T 2200/24* (2013.01); *G06T 2219/2024* (2013.01)

(58) Field of Classification Search
None
See application file for complete search history.

(56) References Cited

U.S. PATENT DOCUMENTS

| | | |
|---|---|---|
| 2024/0095275 A1 | 3/2024 | Tambi et al. |
| 2024/0193351 A1 | 6/2024 | Benedetto et al. |
| 2024/0226750 A1* | 7/2024 | Benedetto ............. A63F 13/213 |

OTHER PUBLICATIONS

X. Han, H. Laga, and M. Bennamoun. "Image-based 3D object reconstruction: State-of-the-art and trends in the deep learning era." IEEE transactions on pattern analysis and machine intelligence 43.5 (2019): pp. 1578-1604. (Year: 2019).

(Continued)

*Primary Examiner* — Frank S Chen
(74) *Attorney, Agent, or Firm* — Seed Intellectual Property Law Group LLP

(57)     ABSTRACT

The present disclosure provides a system that supports generation of media content based on textual inputs. The system is designed to receive text and other forms of content as input. The text input may be amplified using one or more artificial intelligence techniques to produce modified text content. The text content is then processed using an artificial intelligence algorithm configured to perform text-to-image processing to produce image content. The amplification of the text content and the generation of image content based on the text content may be performed iteratively, with changes to the text content in each iteration resulting in a new image that potentially comes closer to the user's desired result for the image content. 3D data may be extracted from the final image and used to generate a 3D model that may be integrated with or used by external systems, platforms, or devices.

26 Claims, 15 Drawing Sheets

(56)    References Cited

OTHER PUBLICATIONS

C. Heidorn, "Explained: Midjourney Weights for Text Prompts", published before Dec. 3, 2022, retrieved from https://web.archive. org/web/20221205181023/https://tokenizedhq.com/midjourney-weights/ on Sep. 23, 2025. (Year: 2022).

ZJ. Wang, et al. "Diffusiondb: A large-scale prompt gallery dataset for text-to-image generative models." arXiv preprint arXiv:2210. 14896 (Year: 2022).

* cited by examiner

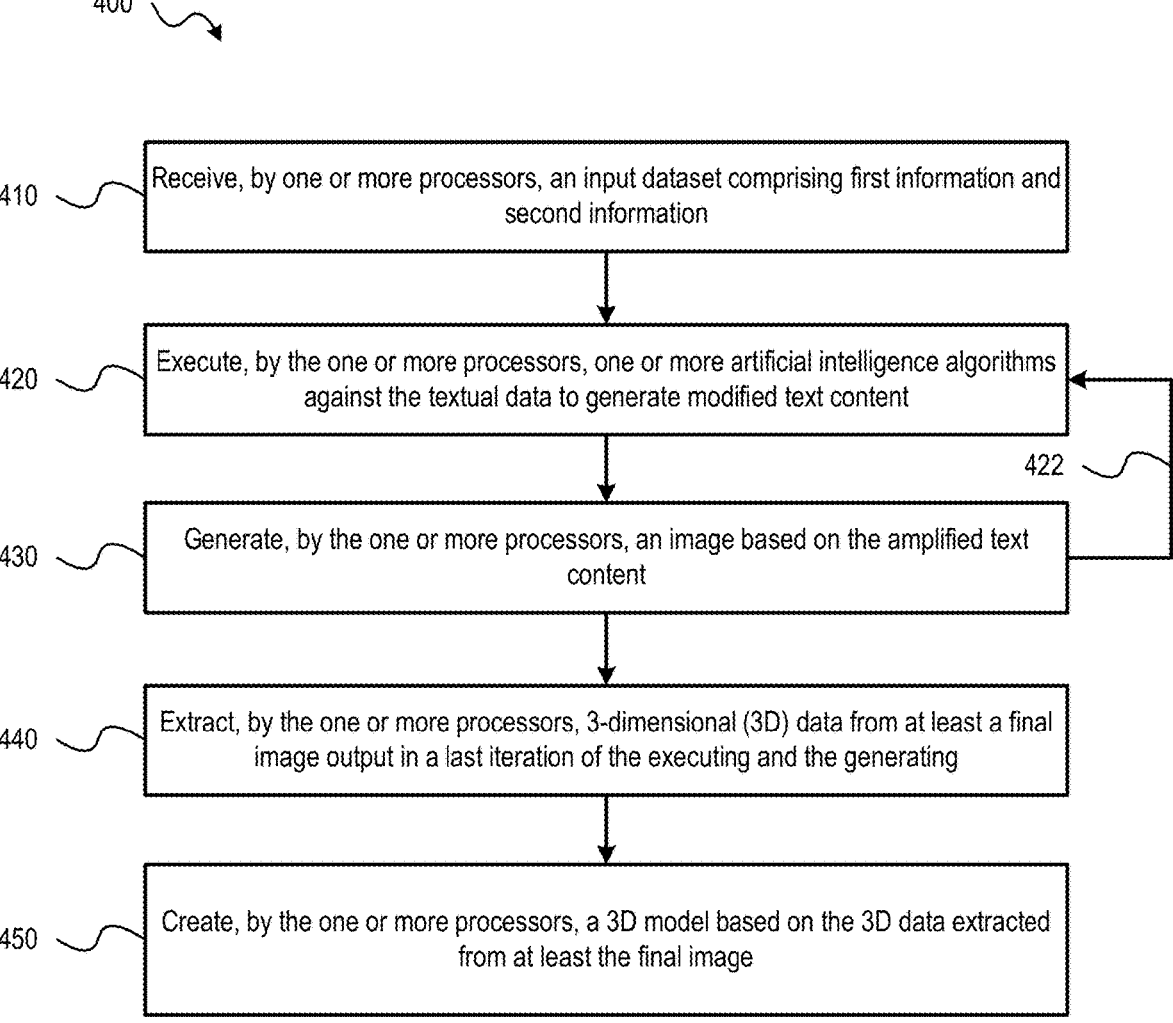

400

410 — Receive, by one or more processors, an input dataset comprising first information and second information 420 — Execute, by the one or more processors, one or more artificial intelligence algorithms against the textual data to generate modified text content

422

430 — Generate, by the one or more processors, an image based on the amplified text content 440 — Extract, by the one or more processors, 3-dimensional (3D) data from at least a final image output in a last iteration of the executing and the generating 450 — Create, by the one or more processors, a 3D model based on the 3D data extracted from at least the final image

FIG. 4

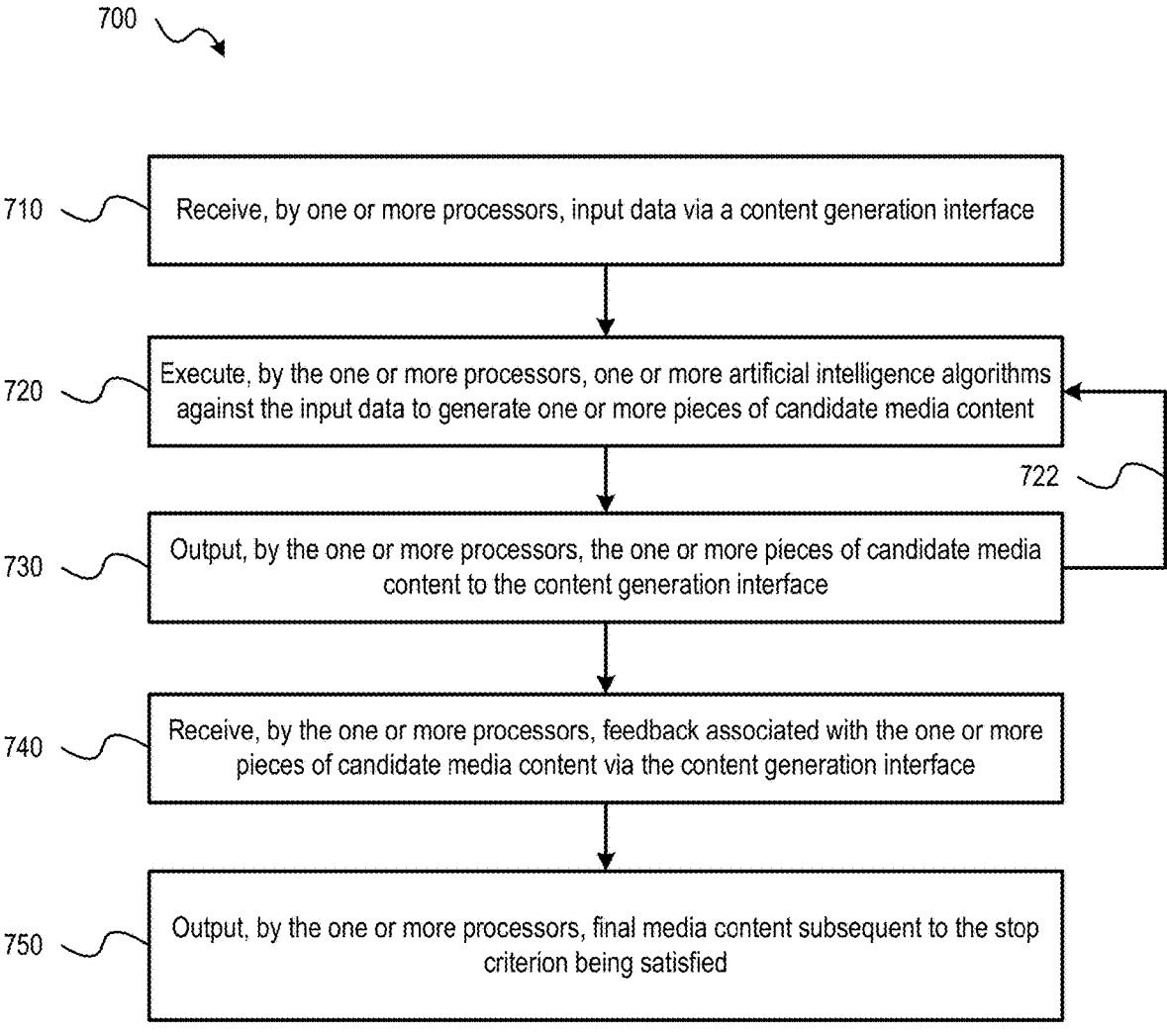

700

710 — Receive, by one or more processors, input data via a content generation interface 720 — Execute, by the one or more processors, one or more artificial intelligence algorithms against the input data to generate one or more pieces of candidate media content

722

730 — Output, by the one or more processors, the one or more pieces of candidate media content to the content generation interface 740 — Receive, by the one or more processors, feedback associated with the one or more pieces of candidate media content via the content generation interface 750 — Output, by the one or more processors, final media content subsequent to the stop criterion being satisfied

FIG. 7

SYSTEMS AND METHODS FOR MEDIA CONTENT GENERATION

PRIORITY

The present application claims the benefit of priority from U.S. Provisional Patent Application No. 63/438,998 filed Jan. 13, 2023, and entitled "SYSTEMS AND METHODS FOR TEXT-BASED MEDIA CONTENT GENERATION", the contents of which are incorporated herein by reference in its entirety.

TECHNICAL FIELD

The present application relates to techniques for generating media content and more specifically, to techniques for generating media content based on text-based inputs.

BACKGROUND

Technology advancements have changed the way people create and obtain media and other forms of content. While just a few decades ago media content was primarily obtained via television, radio, and portable media storage formats (e.g., compact discs and tapes), modern day media content consumers utilize a variety of additional media platforms to obtain content, such as streaming platforms (e.g., SPOTIFY, NETFLIX, YOUTUBE, RUMBLE, TWITCH, etc.), social media platforms (e.g., FACEBOOK, INSTAGRAM, TIK-TOK, TWITTER, etc.), and others (e.g., the metaverse). These additional media platforms have provided new ways for content to be delivered to and consumed (i.e., viewed or listened to) by users, but have also promoted new techniques for generating media content. For example, several of the exemplary media platforms mentioned above enable content to be "livestreamed" (e.g., publishing the content to users as it is being created and published to users), rather than requiring content to be recorded and later published for viewing/listening by users of the media platform(s).

While such capabilities have improved the way that content can be generated and consumed, some of the aforementioned media platforms have also presented new opportunities to enhance the various media content platforms used to access media content. For example, certain media platforms, such as the metaverse (e.g., augmented reality (AR), virtual reality (VR), extended reality (XR), etc.), can render two-dimensional (2D) and/or three-dimensional (3D) content for viewing and/or interaction by users. Presently, generating such 2D and/or 3D content requires special tools and skills that may be used to generate the content presented in the metaverse or other media platforms, such as 3D modelling software or other illustration tools and familiarity with how to create content using such tools. Some of these tools may enable "low" knowledge users to generate content in a rudimentary way that does not require the users to have in depth knowledge of the tools, such as to arrange existing 3D models in a particular manner or combine two or more 3D models to make a new 3D model (e.g., attaching a 3D model of a paperclip to a 3D model of a marker). However, such techniques are limited in terms of what content can be generated by a user who is not an expert in those tools since existing 3D models are required.

Artificial intelligence (AI) and other techniques have been explored as possible alternatives to enable content generation while alleviating the challenges presented by existing tools. However, such content generation techniques are relatively new and present a myriad of new challenges to address (e.g., to enable such techniques to be used by non-technical users). To illustrate, AI-based algorithms and models exist to generate images from text input, but such AI-based techniques currently operate in a take it or leave it fashion in which the user can specify the text input, but cannot refine or control the look or appearance of the content generated by the AI-based algorithm or model based on the text input. For example, some recent models allow for useful captioning of existing images (e.g., image-to-text). However, before designs exist as images, they exist, often in incomplete form, in the heads of creators or designers. These imagined designs often require a high degree of iteration and experimentation to attain a satisfactory result. Thus, existing techniques enable a user to provide a prompt to an AI algorithm or model that is trained to convert text input to an image output, but the image output may not accurately reflect what the user intended by the text input. By way of analogy, it is said that a picture is worth 1,000 words, but existing approaches for text-based AI-based content generation do not provide a mechanism for enabling a user to find which 1,000 words are required in order for a text-based AI content generation technique to generate the content the user is attempting to describe.

SUMMARY

The present application discloses systems, methods, and computer-readable storage media supporting generation of media content based on textual inputs. The disclosed content generation techniques may receive, as input, text content describing an image to be generated. In an aspect, the text-based input may be received as speech and then converted to text. The input may also include other forms of data, such as image data, video data, motion data, gesture data, and the like. The text input may be subjected to an AI-based amplification process designed to enrich or expand the text content, simplify the text content, and/or convert the text content to a prompt suitable for use as input to a text-to-image based AI-algorithm. The user may also modify the text content. The text content may be provided to AI algorithm configured to perform text-to-image processing to produce image content. The process of amplifying the text content and using the amplified text content to generate an image may be performed iteratively until a stop criterion is satisfied. For example, the stop criterion may be when the user finds the image content generated by the text-to-image process accurately reflects the user's vision of the content being created (i.e., the image content matches the content specified by the user in text to within a threshold tolerance). Once the stop criterion is reached, the image content may be subjected to a 3D extraction process designed to extract 3D data from the image content and the 3D data may be used to generate a 3D model (or 2.5D model) that may be suitable for use by one or more external systems, platforms, or devices, such as a metaverse or virtual reality platform or a 3D printer, as non-limiting examples.

In an aspect, the disclosed media content generation techniques may be configured to generate additional image content utilizing an AI algorithm configured to augment image content, such as to augment image content received as input (i.e., from the user or as feedback from the text-to-image processing) based on information described in the text content. As an example, the text content may indicate the (final) image content should depict a dog with a tree in the background, but the image content may only show a dog. As a result of the augmentation algorithm, a tree may be injected into the image content to produce an augmented image that incorporates differences between the input image and the text description of the desired media content.

In an aspect, the disclosed media content generation techniques may be configured to perform image enrichment through a process that converts image-to-text. The image enrichment may be performed based on image content received as input (i.e., from the user or as feedback from the text-to-image processing) and may produce additional text content descriptive of the image content.

In an aspect, the disclosed media content generation process may be configured to generate an animation sequence based on image content (e.g., image-to-video processing). For example, the image content may depict a person in a particular pose (e.g., standing) and the media content generation process may utilize AI-based algorithms to animate the person, such as to generate an animation of the person walking. In an aspect, the animation may be generated using interpolation techniques to move portions of the image content a small amount and then smoothing gaps created by the movement of the portions of the image content. In an aspect, the animation may be further based on motion data received as an input, such as motion data indicating a stride of the person or other types of animation information.

In an aspect, the disclosed media content generation process may utilize feedback mechanisms to refine the (final) media content. For example, the text content may be subjected to amplification processing multiple times, which may include multiple expansions, simplifications, and conversions of the text content to prompts, as well as user-specified alterations of the text content. Modifications to the text content may be provided to the image augmentation process to generate new augmented image data reflecting the changes made to the text content. Additionally, as new images are generated by the text-to-image processing, the new images may also be provided to the image augmentation processing as feedback and used to generate the augmented image content. As an additional example, the image-to-text content generated during the image enrichment processing may be used to supplement or augment the text content during the amplification process, thereby enriching or enhancing the text content. Further, the image content generated via the text-to-image processing and/or the image augmentation processing may be provided as feedback to the animation processing and used to generate additional animation data.

The exemplary techniques for generating media content disclosed herein provide new and improved tools for generating media content (e.g., 2D images, 2.5 or 3D models, animations, etc.) based on textual information. Moreover, the iterative techniques disclosed herein for modifying text content enable a user to obtain insights into how changes in the textual information provided to the various processes for media content generation impacts the generation of image content, thereby enabling media content to be generated in a manner that more accurately reflects the specifications or vision of the user more quickly and without requiring the user to have expertise in 2D or 3D modelling and illustration tools. These insights also improve over prior techniques, which operate in a take-it-or-leave-it manner in which the user must accept the image generated from a text-based input or create a new text-based input without having any insights into how to alter the text-based input to achieve an improved image result. Accordingly, it should be understood that the disclosed techniques and functionality for generating media content represent a technical improvement to media content generation tools and the manner in which text-to-image processing can be performed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein:

FIG. 4 is a flow diagram illustrating an exemplary method for generating media content in accordance with embodiments of the present disclosure;

FIG. 7 is a flow diagram illustrating another exemplary method for generating media content in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
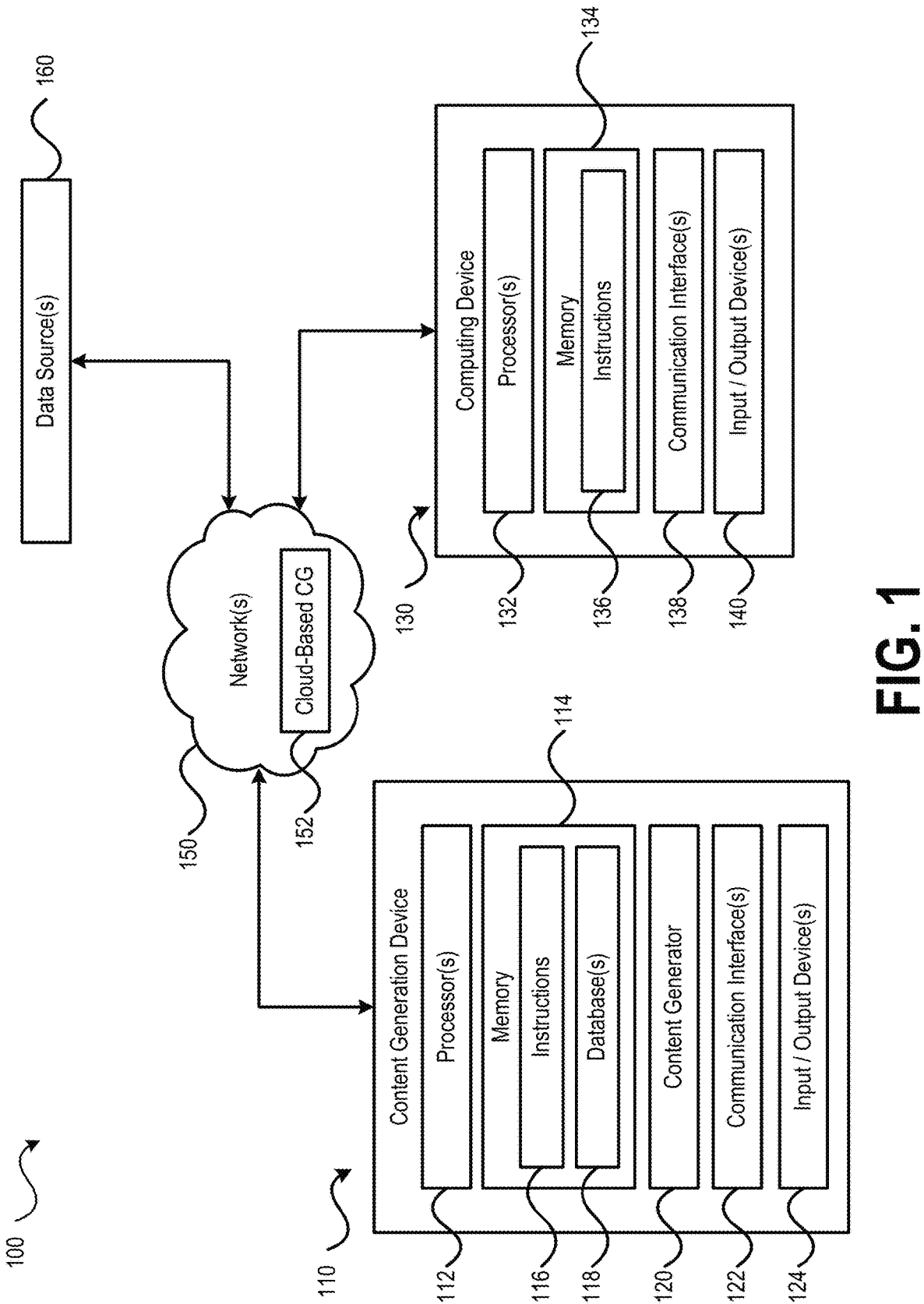
FIG. 1 is a block diagram illustrating a system for generating media content in accordance with embodiments of the present disclosure.

Embodiments of the present disclosure provide systems, methods, and computer-readable storage media for generating media content. In particular, aspects of the present disclosure provide new and improved tools for generating media content (e.g., 2D images, 2.5 or 3D models, animations, etc.) based on textual information. The disclosed techniques may also be performed iteratively to enable modification of text content in a manner that enables a user to obtain insights into how generation of image content is impacted by changes in the textual information provided to the various processes for media content generation, thereby enabling media content to be generated in a manner that more accurately reflects the specifications or vision of the user more quickly and without requiring the user to have expertise in 2D or 3D modelling and illustration tools. Such insights and techniques also represent a technical improvement over prior techniques, which operate in a take-it-or-leave-it manner in which the user must accept the image generated from a text-based input or create a new text-based input without having any insights into how to alter the text-based input to achieve an improved image result. Additional details regarding Referring to FIG. 1, a block diagram illustrating a system for generating media content in accordance with aspects of the present disclosure is shown as a system 100. As shown in FIG. 1, the system 100 may include a content generation device 110 communicatively coupled to a computing device 130 via one or more networks 150. The one or more networks 150 may include local area networks (LANs), wide area networks (WANs), wireless WANs, wireless LANs (WLANs), metropolitan area networks (MANs), wireless MAN networks, cellular data networks, cellular voice networks, the Internet, other types of public and private networks, or a combination of different network types and topologies. The content generation device 110 provides functionality for generating media content and also for engineering prompts that may be used for generating media content without requiring expertise in media content generation tools and techniques. For example, via connectivity provided by the one or more networks 150, a user of the computing device 130 may interact with the content generation devices 110 to generate media content using text (e.g., typed or spoken words), seed images (or video), or other input data, as described in more detail below. It is noted that while the content generation device 110 is shown as a standalone device, the functionality provided by the content generation device 110 may be provided via other implementations to facilitate generation of media content in accordance with aspects of the present disclosure, such as via a cloud-based content generation device or service 152 or as an application running on the computing device 130.

As illustrated in FIG. 1, the content generation device 110 may include one or more processors 112, a memory 114, a content generator 120, one or more communication interfaces 122, and one or more input/output (I/O) devices 124. The one or more processors 112 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the content generation 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the content generation device 110 may be stored in the memory 114 as instructions 116 that, when executed by the one or more processors 112, cause the one or more processors 112 to perform the operations described herein with respect to the content generation device 110. Additionally, the memory 114 may be configured to store one or more databases 118. Exemplary aspects of the one or more datasets 118 are described in more detail below.

The one or more communication interfaces 122 may be configured to communicatively couple the content generation device 110 to external devices and systems via the one or more networks 150, such as the one or more computing devices 130. Communication between the content generation device 110 and the external devices and systems via the one or more networks 150 may be facilitated via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). The one or more I/O devices 124 may include one or more display devices, a keyboard, a stylus, one or more touchscreens, a mouse, a trackpad, a camera, one or more speakers, a microphone, a braille reader (also referred to as a braille display), haptic feedback devices, or other types of devices that enable a user to receive information from or provide information to the content generation device 110, such as information provided as input to the content generation device 110 by a user as part of a media content generation process in accordance with aspects of the present disclosure.

As shown in FIG. 1, the one or more computing devices 130 may include one or more processors 132, a memory 134, one or more communication interfaces 138, and one or more I/O devices 140. The one or more processors 132 may include one or more microcontrollers, ASICs, FPGAs, CPUs and/or GPUs having one or more processing cores, or other circuitry and logic configured to facilitate the operations of the computing device 130 in accordance with aspects of the present disclosure. The memory 134 may include RAM devices, ROM devices, EPROM, EEPROM, one or more HDDs, one or more SSDs, flash memory devices, NAS devices, or other memory devices configured to store data in a persistent or non-persistent state. Software configured to facilitate operations and functionality of the computing device 130 may be stored in the memory 134 as instructions 136 that, when executed by the one or more processors 132, cause the one or more processors 132 to perform the operations described herein with respect to the computing device 130, as described in more detail below.

The one or more communication interfaces 140 may be configured to communicatively couple the computing device 130 to external devices and systems via one or more networks 150, such as the content generation device 110 (or the cloud-based content generation device 152). Communication between the computing device 130 and the external devices and systems via the one or more networks 150 may be facilitated via wired or wireless communication links established according to one or more communication protocols or standards (e.g., an Ethernet protocol, a TCP/IP, an IEEE 802.11 protocol, an IEEE 802.16 protocol, a 3G communication standard, a 4G/LTE communication standard, a 5G communication standard, and the like). The I/O devices 142 may include one or more display devices, a keyboard, a stylus, one or more touchscreens, a mouse, a trackpad, a microphone, a camera, one or more speakers, a braille reader (also referred to as a braille display), haptic feedback devices, or other types of devices that enable a user to receive information from or provide information to external devices, such as the content generation device 110.

As illustrated in FIG. 1, the content generator device 110 includes the content generator 120. The content generator 120 provides functionality that enables a user to generate media content without requiring special knowledge or skills (e.g., how to use 3D modelling tools or 2D image generation software). For example, the content generator 120 may include a language configurator and/or an image configurator providing functionality for generating media content using text-based input, image-based input (e.g., one or more images, video content, etc.) or both. The language configurator may provide functionality to support a set of processes and data flows for configuring the language included in the text content used to generate an image in accordance with aspects of the present disclosure. The image configurator may provide functionality to support a set of processes and data flows for configuring properties of images generated by an image generation process in accordance with the present disclosure. Exemplary details of a language configurator and an image configurator in accordance with the aspects of the present disclosure are described in more detail below with reference to FIGS. 3A-3F.

In an aspect, the content generator 120 may include a speech-to-text (S2T) engine that enables text-based input to be obtained from speech inputs provided by a user (e.g., as opposed to the user typing text using the I/O devices 140). The S2T engine may be configured to accept spoken inputs in multiple languages. For example, while S2T engines are commonly configured to accept speech in the English language, the S2T engine of the content generator 120 may be accept speech input in English and other languages. In addition to enabling users to provide speech inputs to the content generation device 110 using different languages, the ability to accept speech input in different languages may enable content generation to be performed in a more robust manner, such as to capture nuances associated with different languages that may impact the media content generated based on the input speech. As an example, enabling a user to specify inputs for media content generation as speech in different languages may enable cultural differences to be accounted for in the resulting media content (e.g., some languages have multiple words for some colors). When speech input is provided as input, the S2T engine may convert the speech input to text for subsequent use by the content generator 120 for generating media content, as described in more detail below.

In an aspect, certain processes performed by the content generator 120 (e.g., text-to-image processing, text expansion/simplification, etc.) may be designed to utilize text-based content in a certain language (e.g., English) and the S2T engine may be configured to translate speech input from an input language (e.g., French, German, Russian, Japanese, Mandarin, etc.) to the native language for processing (e.g., English). In such an example implementation, the text resulting from the speech input may also be presented to the user in the native or input language spoken by the user when providing the speech input. To illustrate, the user may provide a speech input in a first language. The speech input may be converted to text in a second language (e.g., a native language of a text-to-image algorithm or a text amplification engine) for processing. As part of the processing the text generated based on the speech input may be modified and the modified text may be presented to the user. In such instances, the modified text may be in the native processing language (e.g., English), but may be converted to the input language (e.g., the language of the speech input from the user) prior to presenting the modified text to the user. In additional or alternative implementations the content generator 120 may be configured to perform the various processes described herein using different language, rather than having processing be performed using a native language. This may limit loss of data that may result from translation of information between different languages, especially where information is translated from one language to another than then back to the original language.

Whether received as text or the text is generated from speech input, the content generator 120 is configured to utilize the text input to generate to generate media content. For example, the text-based input may describe a scene (e.g., a house, a landscape, a city, a room, etc.), an animal, a vehicle (e.g., an automobile, an aircraft, a watercraft, etc.), an object (e.g., a key, a book, a etc.), or other types of content capable of being described with text. To generate the media content from the text-based input, the content generator 120 may include a text-to-image generator configured to generate image content from the text input. For example, if the text-based input includes the word house, the text-to-image generator may generate an image of a house.

It is noted that the above-described operations provide a simplistic example of the functionality provided by the content generator 120, but that the content generator 120 may provide additional functionality for enhancing the ability of the content generator 120 to generate media content in accordance with aspects of the present disclosure. For example, the content generator 120 may enable a user to generate media content in an iterative fashion that enables the user to understand how changes to the text-based inputs alter the media content generated by the content generator 120, which may enable the user to learn how to engineer prompts for text-based media content generation in a manner that more accurately reflects the user's vision for the media content, as expressed in the text input to the content generator 120. Exemplary aspects of an iterative process for generating media content and prompt engineering are described in more detail below.

In addition to or as an alternative to generating media content based on text-based inputs, the content generator 120 may also accept other forms of input, such as 2D images and video content. For example, a user (e.g., a user of the computing device 130) may provide inputs to the content generation device 110 in the form of 2D image content that exemplifies content the user would like to generate, perhaps with modifications designated by the user. As an illustrative example, the user may submit an image of a dog or multiple images of dogs in order to generate media content depicting a dog. As a non-limiting example, the input image(s) may depict one or more dogs having certain features (e.g., long hair, short hair, ears that droop or hang down, ears that point up, a long tail, a bobbed tail, etc.), and the content generator 120 may utilize the images to generate a 2D image or images of a dog having features based on the dog or dogs depicted in the input image(s). In an aspect, the user may modify the media content generated based on the input image(s), such as to provide text-based inputs that indicate one or more features of the dog that is to be generated based on the sample image(s). For example, the sample images may include dogs of a certain color, but the user can provide text inputs indicating the dog should be another color. As another example, the user can add features to the dog that are not present in the sample image(s), such as to add wings, horns, spots, spikes, or other features to the dog depicted in the media content output by the content generator 120.

As briefly explained above, the content generator 120 may provide functionality to facilitate an iterative process for generating media content. To illustrate, the content generator 120 may present a preview of the media content generated based on the input(s) provided by the user to enable the user to evaluate whether the generated media content accurately depicts the content desired by the user. If the generated media content does not reflect the user's desired content, the user may modify the inputs to the content generator 120 and new media content including alterations according to the modified set of inputs may be generated by the content generator 120. A preview of the modified media content may be presented to the user and the above-described process may be repeated until the user is satisfied with the media content resulting from a current set of inputs.

Using the above-described iterative process may enable a user to understand how changes to the inputs are interpreted by the content generator 120 and impact the generated media content. For example, the user may change a few words in the text-based input and as a result, modifications of the media content may be displayed as part of the preview provided by the content generator, thereby enabling the user to see how the modifications to the text-based input altered the resulting media content. In an aspect, the user may be shown multiple previews along with different iterations of the text-based inputs, thereby providing the user with a way in which to view how each change impacted the resulting media content and draw insights with regard to how changes to the inputs impact generation of media content. Such insights may enable users to more efficiently engineer media content generation prompts (e.g., text-based inputs for generating media content) and as a result, enable media content to be generated from text-based inputs designed to more accurately reflect the intent of the text-based inputs (i.e., require fewer and fewer iterations before obtaining satisfactory inputs). It is noted that while text-based inputs and image-based inputs have been described above, the inputs that may be provided by a user during a content generation process in accordance with the present disclosure may include text content, image content, video content, motion content (e.g., information specifying animations or movements), 3D model data (e.g., 3D models, text-based descriptions of 3D models, etc.), gesture data (e.g., information regarding gestures that may be used to interact with or animate content generated in accordance with the present disclosure), or other forms of data that may be used to aid or enhance the content generation techniques disclosed herein.

To further illustrate the exemplary operations described above, FIG. 2A illustrates operations of a content generator in accordance with aspects of the present disclosure are shown with reference to a content generator 200. In an aspect, the exemplary content generator 200 shown in FIG. 2A may be the content generator 120 of FIG. 1. In the exemplary embodiment shown in FIG. 2, a content generator in accordance with aspects of the present disclosure may include a input data engine 210, an augmentation engine 202, a content engine 270, and a processing engine 280. In the embodiment shown in FIG. 2B, the augmentation engine 202 is shown to include a text amplification engine 220, an media content generation engine 230, and a media content augmentation engine 240. In the embodiment shown in FIG. 2C, the augmentation engine 202 is shown to include an media content enrichment engine 250, and an animation engine 260. In FIG. 4D, an embodiment showing the augmentation engine 202 including the text amplification engine 220, the media content generation engine 230, the media content augmentation engine 240, the media content enrichment engine 250, and the animation engine 260. It is noted that FIGS. 2B-2D illustrate exemplary configurations of the augmentation engine 202 for purposes of illustration, rather than by way of limitation and it should be understood that the augmentation engine 202 may be configured to support additional types and combinations of functionality in accordance with the concepts described herein. In the description below the functionality provided by the augmentation engine 202 is described with reference to the text amplification engine 220, the media content generation engine 230, the media content augmentation engine 240, the media content enrichment engine 250, and the animation engine 260. While illustrated in FIGS. 2B-2D as being separate engines, such illustration is intended to enable the functionality to be described logically and the functionality provided by each of the different engines may be provided by a single engine (e.g., the augmentation engine 202), or by multiple engines, which may vary from the specific engines shown and described below with reference FIGS. 2B-2D.

Figure 2A:
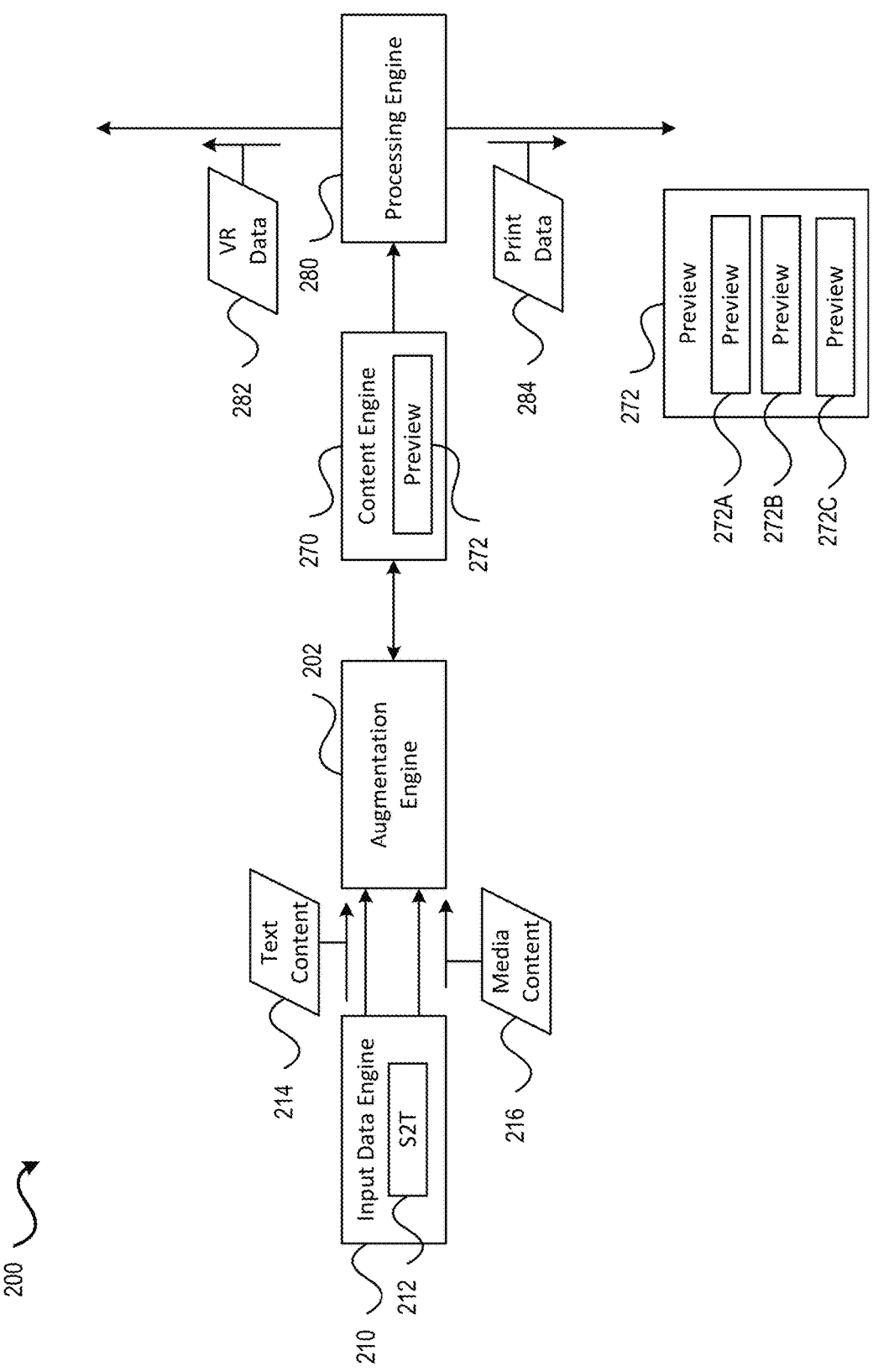
FIG. 2A-2D are block diagrams illustrating exemplary aspects of content generators for generating media content in accordance with aspects of the present disclosure.
Figure 2B:
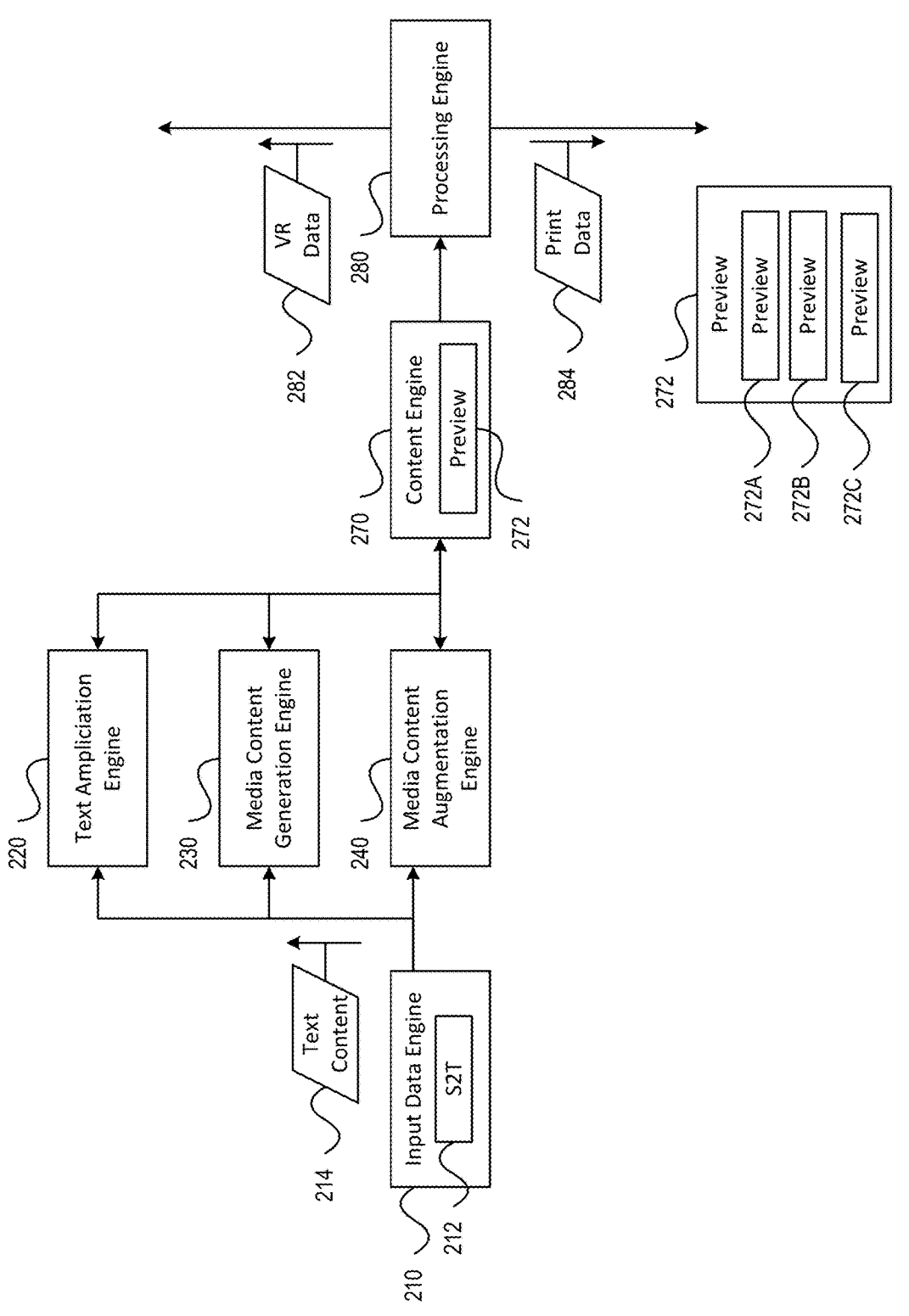
Figure 2C:
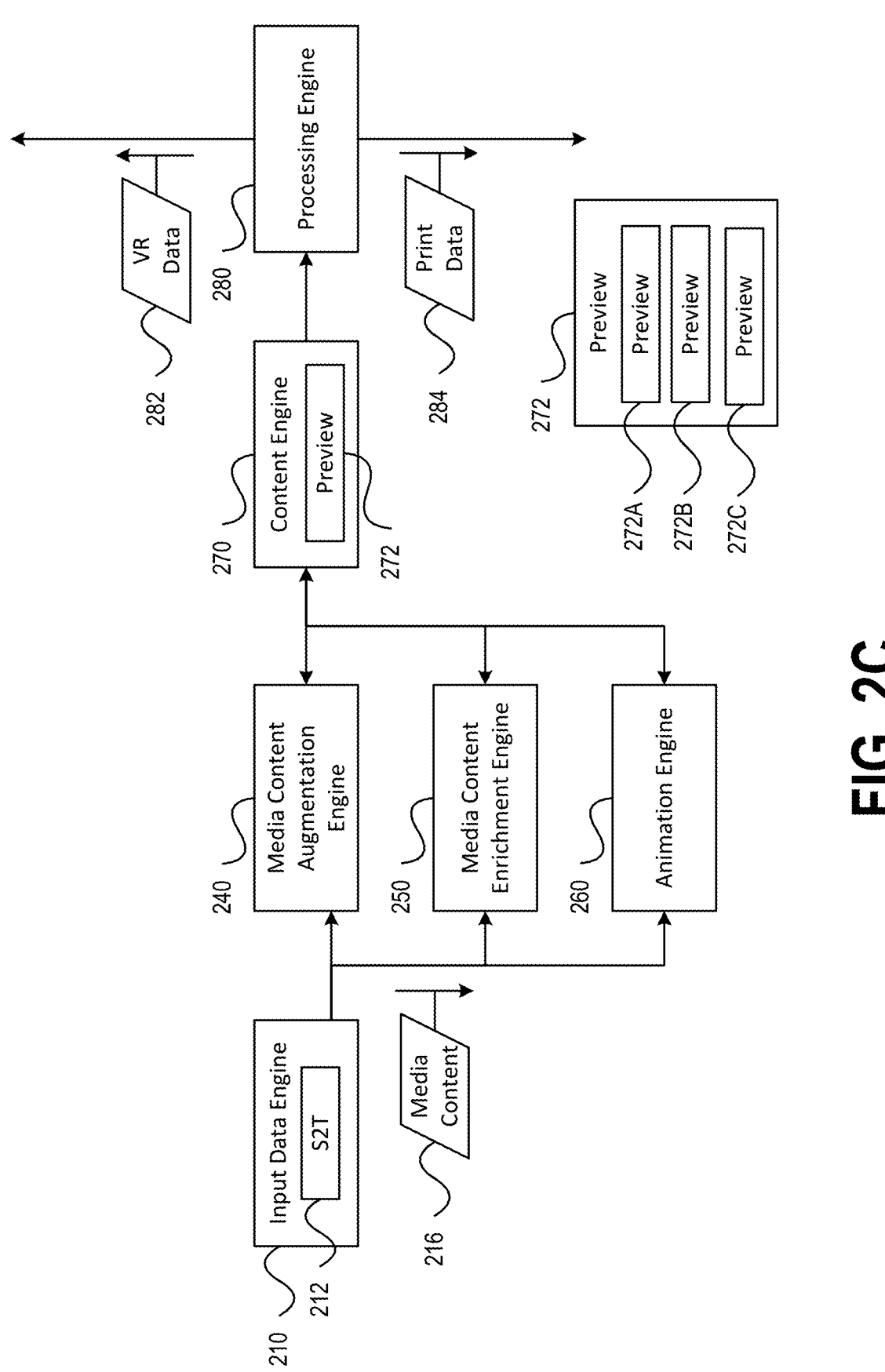
Figure 2D:
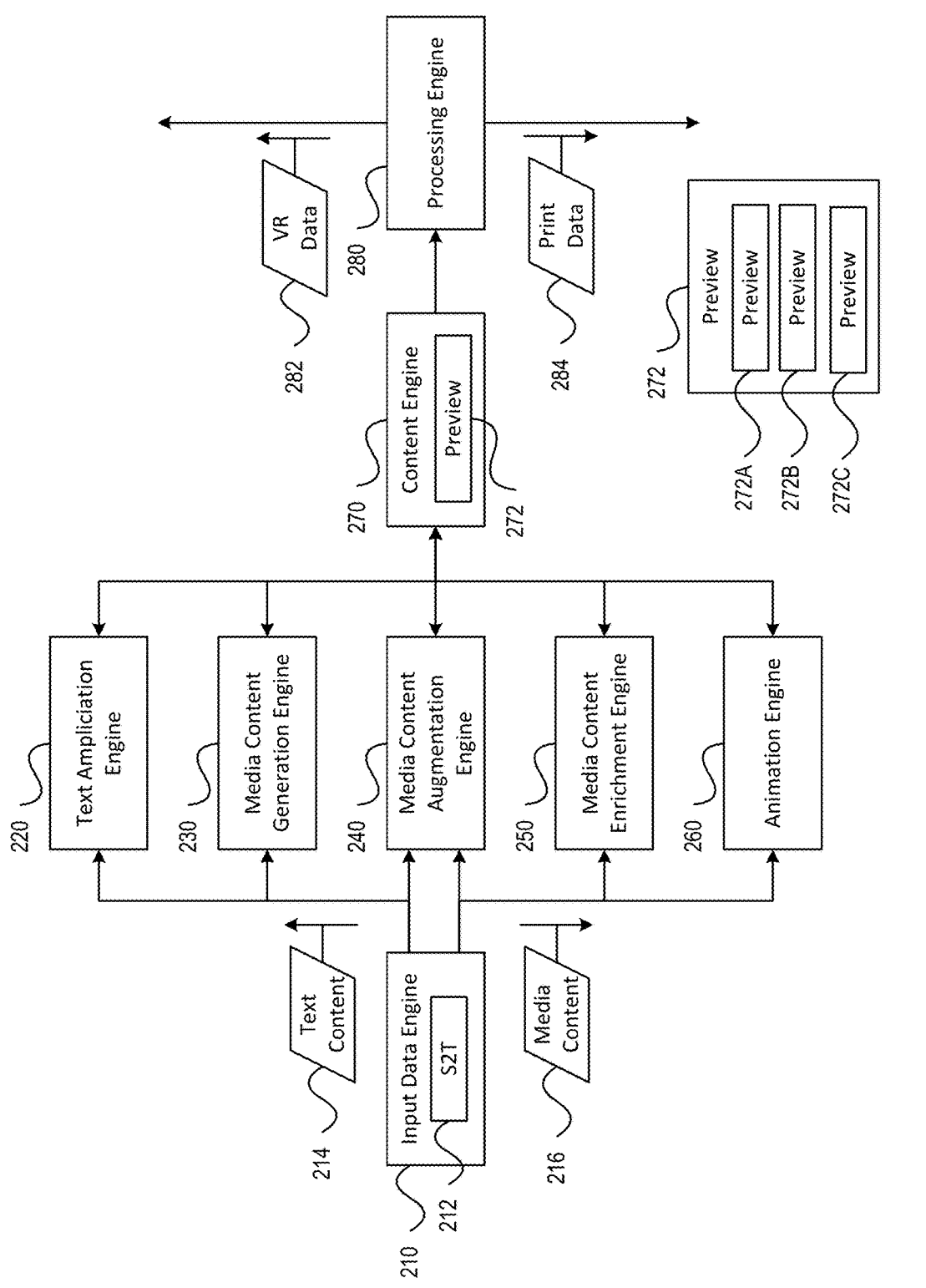

As shown in FIGS. 2A-2D, the input data engine 210 may be configured to receive an input dataset from a user. In FIGS. 2A, 2B, and 2D, the input dataset may include text content 214, while in FIGS. 2A, 2C, and 2D, the input dataset may include media content 216. It is noted that in the embodiments of FIGS. 2A and 2D the augmentation engine 202 (or its individual engines described herein with reference to FIGS. 2B-2D) may receive an input dataset that includes the text content 214, media content 216, other types of content, or a combination thereof. In an aspect, the text content 214 may be generated using a S2T engine 212. As explained above, the S2T engine 212 may be configured to recognize speech in different languages and convert the speech to the text input 214. By utilizing a S2T engine capable of generating the text input 214 based on different languages may enable the content generator to generate media content that captures nuances reflected by the language in which the speech input is provided (e.g., specific colors or color schemes, cultural differences, etc.). For example, some languages use different modifiers to refer to specific objects, such as using a first modifier to refer to a rock and a second modifier to refer to a pebble. While some cultures or languages may refer to rocks and pebbles as rocks, other language may distinguish between them due to size (e.g., rocks are normally viewed as being larger than pebbles). Capturing such differences through accepting inputs via speech using different languages may enable users to more accurately achieve images and media content that meet their specifications despite differences in the language used to specify the text content input to the system. As another example, models trained to generate image content based on certain languages may be biased to certain color schemes or color polarities (e.g., images generated from text input specified in one language may include orange/teal color bias that would not be present if the text input was specified in another language). To illustrate, the Russian language has two words for the color that in English we call "blue". One word, голубой, means light blue (e.g., sky blue) and the other, синий, means dark blue (e.g., sea blue). When a Russian speaker uses one and not the other, the S2T engine can recognize the meaning of these two different words and reflect that choice in the media output it produces. Thus, the S2T engine may lead to nuanced enhancement of AI-generated media content by detecting and accounting for nuances between or across languages and cultures. In an aspect, the input data engine 120 (or another component shown in FIG. 2) may be configured notify a user of any known color biases or other language-specific biases that may impact images generated based on the text input.

In addition to accepting speech and/or text-based inputs, the input data engine 210 may also receive one or more pieces of media content, shown as media content 216 as inputs to a content generation process. The media content 216 may include image content (e.g., .gif files, .jpeg files, and the like), video content, or other types of multi-media content suitable for supporting the operations described herein. It is noted that data used for content generation in accordance with the concepts disclosed herein may take a variety of forms. It can be trend data captured from an analysis of online chatter, such as found by analyzing trending new terms used by influencers. For example, if influencers start using the term "bronzepunk", or even using terms that implicitly refer to it, such as talking about the Antikythera mechanism when referring to the design of digital consumer products, the system may recognize that and incorporate it in into the augmentation engine 202. More prosaically, the system can take things such as scans of napkin sketches, or sales trends (e.g., teal and beige are trending high in Rio) and use that information as part of the augmentation. Media or media can also include movement data, such as how a machine moves (e.g., bike pedals rotate in circles, so when generating bike pedal-related images it may be useful to generate things that go in circles) or how a person moves (e.g., using inverse kinematics the system 100 may determine how joints need to be configured to accomplish a certain task, which can be fed in as a constraint for the augmentation engine, such as via constraints that specify "whatever you generate, it needs to stay inside the following envelope"). It is noted that while text-based inputs and media content-based inputs have been described above, the inputs that may be provided by a user during a content generation process in accordance with the present disclosure may include text content, image content, video content, motion content (e.g., information specifying animations or movements), 3D model data (e.g., 3D models, text-based descriptions of 3D models, etc.), motion capture data, gesture data (e.g., information regarding gestures that may be used to interact with or animate content generated in accordance with the present disclosure), or other forms of data that may be used to aid or enhance the content generation techniques disclosed herein.

As shown in FIG. 2A, the text content 214 may be provided to augmentation engine 202 (e.g., the text amplification engine 220, the media content generation engine 230, and the media content augmentation engine 240 in the embodiments of FIGS. 2B-2D). The augmentation engine 202 may be configured to apply various machine learning and artificial intelligence algorithms to the text content to produce modified text content. As a non-limiting example, and referring to FIGS. 2B-2D, the text amplification engine 220 may be configured to generate additional text content based on the text content 214 using one or more AI-based techniques (e.g., AI-based chatbots, large language models (LLMs), or other AI-based algorithms) that can generate text based on a given set of inputs. The additional text generated by the text amplification engine 220 may provide additional and/or alternative expressions of the input text data, which may improve the results achieved when generating media content based on the input text content. For example, the text amplification engine 220 may be configured to perform text expansion based on the text content input by a user and may also perform text simplification based on the text content input by the user. For text expansion, the text amplification engine 220 may expand the input text content by generating additional text content that is related to the input text. As part of the text expansion, the original text input may be expanded upon in a manner that includes additional text description of the subject matter in the input text content, such as to include words and vocabulary that may describe the subject matter of the original text content in a manner that uses words the user may not have used or thought of to describe the target subject matter the user is attempting to capture through the disclosed content generation techniques. Additionally, the simplification process performed by the text amplification engine 220 may be configured to simplify the input text (or the expanded text content), such as to summarize or shorten the input text.

It is noted that the text expansion and simplification processes may be performed iteratively. For example, a user may expand the text content 214 to obtain expanded text content and then perform expansion on the expanded text content to obtain further expanded text content. Furthermore, the user may simplify text content multiple time as well, such as to simplify the text content 214 to obtain simplified text content and then simplify the simplified text content one or more additional times to obtain further simplified text content. Additionally, the expansion and simplification of text content may be performed in an alternating fashion, such as to expand the text content 214 to obtain expanded text content and then simplify the expanded text content, or simplify the text content 214 to obtain simplified text content and then expand the simplified text content. It is to be understood that the various expansion and simplification techniques described above can be performed multiple times and in different combinations at the direction of the user (e.g., the user can specify whether to expand the text content, simplify the text content, or both) using a graphical user interface, such as a language configurator interface, as described in more detail with reference to FIG. 3E. Additionally, the graphical user interface may enable a user to manually modify the text content (e.g., the text content 214, the expanded content, the simplified content, and so on), such as to modify words in the text content, modify weights of the words, and other operations to configure the text input, which may subsequently be used to generate an image of the subject matter described by the text content.

The text expansion and simplification techniques applied by the text amplification engine 220 may include terms that may not aid in generation of media content (e.g. too many verbs) or that that may not be optimal or effective for generation of images. Thus, in an aspect, the output of the text amplification engine 220 may be subjected to an AI model or algorithm configured to convert the text to a prompt format that may be more suitable for use by the media content generation engine 230 for image generation. For example, the AI model or algorithm may be trained based on a database of prompts (e.g. one of the databases 118 of FIG. 1) and as a result of the training, may be configured to generate a text-based prompt based on text content received as part of the input dataset. The prompt format may differ from certain sentence structures that might result from the text expansion and simplification. For example, a prompt may include no or few verbs—instead, the prompt may include predominately nouns and adjectives (e.g., terms used to describe information depicted in an image). Converting the text content to a prompt in this manner may improve the image resulting from a text-to-image process due to the improved sentence structure and format of the prompt.

The media content generation engine 230 may be configured to generate a 2D image based on the text content 214. For example, the media content generation engine 230 may include an AI-based text-to-image generator trained to generate images based on text input (e.g., the text content 214). Additionally, as described above, the media content generation engine 230 may also be configured to generate images based on other text content (e.g., as part of an iterative process), such as based on the text content output by the text amplification engine 220 or text input(s) that have been modified by a user (e.g., before or after amplification by the text amplification engine 220). The content engine 270 may be configured to provide a preview 272 of the image(s) output by the media content generation engine 230, such as via a content generation interface. In an aspect, the preview 272 may enable the user to see how changes to the inputs (e.g., the text content, the image content, or other types of inputs) impact the resulting media content generated by the content generator (e.g., the content generator 120 of FIG. 1), as briefly described above. That is to say, the generation of media content according to the concepts described herein may be performed in an iterative manner in which an initial set of candidate media content may be generated based on an initial set of input data (e.g., the text content 214, the media content 216, or both) during a first iteration and the functionality of the augmentation engine may be used to modify the input data. During subsequent iterations additional candidate media content may be generated by the augmentation engine using modified input data and feedback obtained the various functionalities described herein. To illustrate, an initial set of preview media content (e.g., candidate images or candidate media content) may be generated based on an initial set of inputs, such as the input data 214 (e.g., in the embodiment of FIG. 2B, and presented to the user, as previews 272A, 272B, 272C. New or additional media content (e.g., image content, video content, etc.) may be generated in one or more subsequent iterations as changes are made to the text content or other inputs using the functionality of the text amplification engine (and potentially other functionality of the augmentation engine 202 described below) and previews of the new or additional media content may be presented to the user (e.g., an updated or new set of previews 272A, 272B, 272C), each representing different media content resulting from modified versions of the text input (or other types of feedback) obtained using the above-described functionality of the text amplification engine 220 (and potentially other functionality of the augmentation engine 202) as described herein.

Providing the previews 272A-272C may enable the user to see how the generated media content is impacted by changes to the text input, which provides the user with insights into how language in the text input is interpreted by the media content generation engine 230 when generating media content, such as one or more 2D images. Such insights may enable the user to better understand how nuances in the language of the text input impact the resulting media content, thereby enabling the user to learn how to more intelligently design text inputs that reflect an image or media content desired by the user.

In addition to the text content 214, the media content augmentation engine 240 (e.g., shown in FIGS. 2B-2D) may receive the media content 216. As the name implies, the media content augmentation engine 240 may be configured to augment image content. For example, the media content augmentation engine 240 may be configured to modify a resolution of the image(s) included in the image content 216, such as to generate a higher resolution or lower resolution image based on the image content. Additionally, the media content augmentation engine 240 may be configured to modify the image content based on information included in the text content 214 (or modified text content generated via the functionality provided by the text amplification engine 220). For example, the media content 216 may include an image of a dog and the text content may indicate there is a tree in the background. The media content augmentation engine 240 may be configured to modify the media content 216 to generate an image that includes the dog, but also includes a tree in the background according to the text content 214. It is noted that this example augmentation of media content has been described for purposes of illustration, rather than by way of limitation and that the media content augmentation engine 240 may be configured to apply other types of modifications and alterations to image content. In an aspect, the media content output by the media content augmentation engine 240 may be presented as previews, such as the preview 272.

The media content enrichment engine 250 may be configured to extract text content from the image content 216. For example, the media content enrichment engine 250 may be configured to identify a number of objects (i.e., distinct elements) within the image content 216 and to identify the objects (e.g., the media content 216 includes one object representing a dog in the example above). Additionally, the media content enrichment engine 250 may detect other elements within the media content 216, such as the number of lines, number of corners, color distribution information, and the like. The media content enrichment engine 250 may be configured to output textual representations of the features identified in the media content 216, such as textual representations of the various features described above or other features.

The animation engine 260 may be configured to extract frames from video content (e.g., if the image content 216 includes video content) and convert the frames to text, similar to the manner described above with reference to the media content enrichment engine 250. Additionally or alternatively, the animation engine 260 may be configured to perform image interpolation to generate additional image content, such as an animation of content of an image. To illustrate, the media content 216 may include an image depicting a person with a baseball bat and ball approaching the person. The animation engine 260 may be configured to generate an animated sequence of images that show the person swinging the bat in an attempt to strike the approaching ball. To animate the media content generated by the media content generation engine 230 or the media content 216 provided as input, the animation engine 260 may be configured to interpolate features of the media content 216 to incrementally move the elements of the media content, thereby creating an animation from the media content. For example, the person may be depicted in the media content 216 within an image holding the bat above the person's shoulder and the animation engine 260 may generate a first image in which the person is dropping their front shoulder slightly and the bat begins to move downward and horizontal to the ground. Such modifications may be made by moving the image content a small amount and interpolating information based on the image to fill in the gaps resulting from the movement (e.g., change the angle of the bat slightly and then add background content through interpolation to fill in the content where the bat was prior to moving the bat). In this manner, the animation engine 260 can generate additional media content that may be used provide additional information about the media content to be generated by the media content generation engine 230.

The content engine 270 may be configured to provide previews of the various image content described above, such as the outputs of the media content generation engine 230, the media content augmentation engine 240, and the animation engine 260, as described above. Additionally, the content engine 270 may provide functionality for performing 3D conversion of the generated media content to produce 3D content. For example, an image content output based on the input data (e.g., the text content 214, the image content 216, and/or other types of input data) may depict a 2D representation of a 3D object or scene. The content engine 270 may include one or more AI models trained to extract 3D information from 2D images, such as images output by the media content generation engine 230, and the extracted 3D information may be used to generate a 3D model of the content depicted in the 2D image. In an aspect, the 3D model of the content depicted in the 2D image may be a 2.5D image, at least initially. To illustrate, the one or more AI models of the content engine 270 that have been trained to extract 3D information from 2D images may be configured to estimate a depth of each pixel in the 2D image, thereby transforming RGB data representing the pixels of the 2D image into RGB depth (RGBD) data. The RGBD data may provide a depth map for the pixels of the 2D image (e.g., information indicating a depth of each pixel in the image within a coordinate system, such as to assign each pixel an (x, y, z) coordinate within the coordinate system, which may be represented by the 3D information extracted by the one or more AI models. It is noted that the 3D information may be incomplete, and thus referred to as 2.5D image data, since the 3D information is limited to what is depicted in the image(s) (i.e., the backside of objects and content depicted in the image(s) is not reflected in the depth map or 3D information).

In an aspect, 3D information may be supplemented or augmented using additional image content to fill in the gaps and transform the 2.5D image into a full 3D image. For example, the content generator 220 may be used to generate different views of the target image content, such as a top view, side views, perspective views, a bottom view, and the like. Additionally or alternatively, video content output by the animation engine 260 may be used to generate additional 2.5D images. These different views may be subjected to the 3D information extraction process described above to produce additional 2.5D image content based on the text content and the different 2.5D image content may be combined to create full 3D information (e.g., a 3D model of the target content associated with the image). In an aspect, the 2.5D image content may not fully align completely due to differences in the images output by the media content generation engine 230 or other functionality illustrated in FIG. 2. However, interpolation techniques may be used to smoothen the combination of the different 2.5D images. The 3D image(s) generated by the content generator 270 may be represented as a 3D model (e.g., a point cloud, a spline model, etc.).

The 3D image(s) or model(s) may be provided to a processing engine 280 that provides functionality for exporting the 3D image(s) to external devices or platforms. For example, the processing engine 280 may be configured to generate virtual reality (VR) data 282 suitable for integration with a VR platform (e.g., a metaverse platform) or may generate print data 284 providing instructions to a 3D printer for printing the subject matter represented by the 3D model output by the content engine 270. It is noted that 3D models generated in accordance with the present disclosure may also be utilized in other contexts, such as for incorporation into a video (e.g., a movie, television show, etc.), a video game, or other use cases where 3D models may be used (e.g., product design tools). As noted above, the information used to generate the 3D model may include motion data, which may be received as part of the input data provided to the augmentation engine 202 and/or generated via one or more of the above-described engines. The motion data may be used to define how one or more elements of the 3D move, such as to specify a gait of a person, animal, or creature included in the 3D model. The motion data may also be used to define animations of objects represented in the 3D model, such as to animate opening of a book or turning the pages of the book. Additionally, the motion data may specify gestures that may be used to interact with an object represented by the 2D, such as to specify a gesture that may be used by a user of a VR platform to grab an object, interact with the object, etc. It is noted that the various examples of how motion data may be utilized by embodiments of the present disclosure have been provided for purposes of illustration, rather than by way of limitation and that motion data may be utilized to provide other functionalities in accordance with the concepts described herein.

Figure 3A:
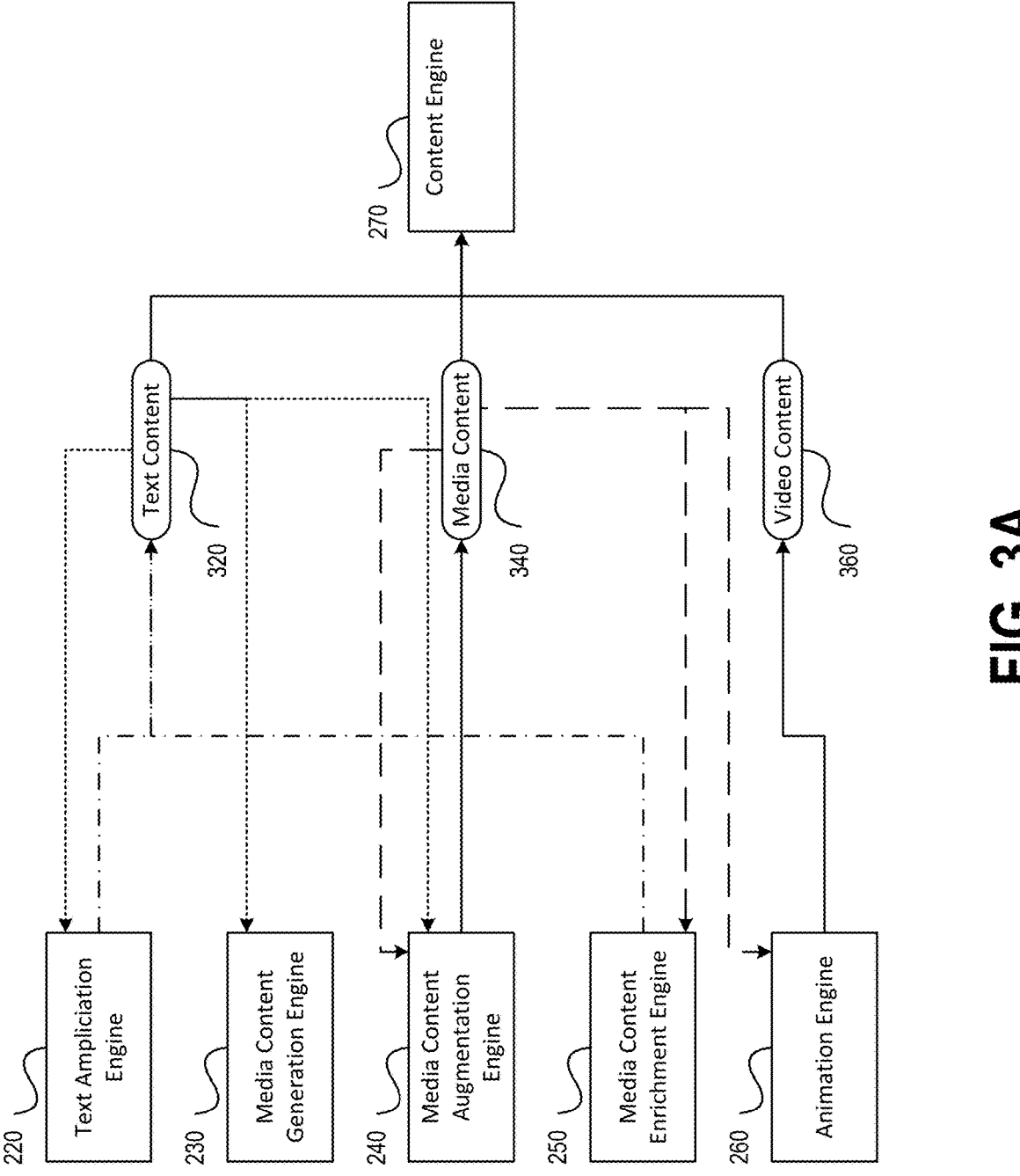
FIG. 3A is a diagram illustrating exemplary types of feedback that may be utilized by a content generator for generating media content in accordance with aspects of the present disclosure.

Referring to FIG. 3A, a diagram illustrating exemplary types of feedback that may be utilized by a content generator for generating media content in accordance with aspects of the present disclosure is shown. As shown in FIG. 3A, the text amplification engine 220, the media content generation engine 230, the media content augmentation engine 240, the media content enrichment engine 250, the animation engine 260, and the content engine 270 of FIGS. 2B-2D are shown. Each of these elements may operate as described above with reference to FIGS. 2B-2D, but may be further configured to utilize feedback mechanisms to refine the content generation process illustrated in FIG. 3A, as explained in more detail with reference to FIG. 3D below. In particular, FIG. 3A shows text content 320, 3D image content 340, and video content 360. The text content 320 may include the text content input by the user (e.g., text content 214 of FIG. 2), as well as we modified text content output by the text amplification engine 220, as described above. The text content 320 may additionally include text content generated by the media content enrichment engine 250, which is configured to generate text based on images (e.g., image to text conversion), as described above with reference to FIG. 2. The media content 340 may include image content output by the media content generation engine 230 (e.g., text to image processing) and the media content augmentation engine 240 (e.g., image to image processing), and the video content 360 may include video content, as described above with reference to FIG. 2A-2D.

As explained above, the text content 320, the media content 340, and the video content 360 may be provided to the content engine 370 and used to generate the 3D image or media content. Additionally, all or portions of this data may be provided as feedback (e.g., modified media content, modified text content, etc.) during an iterative process in accordance with aspects of the present disclosure. For example, the text content 320 may be provided to the text amplification engine 220 for additional processing (e.g., expansion, simplification, user modifications, etc.) and may also be provided as feedback to the media content generation engine 230 and the media content augmentation engine 240. As explained above, the media content generation engine 240 generates images based on text inputs and thus, may use the modified text content provided as feedback to generate additional candidate image content (e.g., as the user iteratively modifies and refines the text content 320). Similarly, the media content augmentation engine 240 may use different versions of the text content generated using the functionality of the text amplification engine 220 to generate the additional candidate image content (e.g., image content augmented based on the text content).

Furthermore, as shown in FIG. 3A, the media content 340 may also be provided as feedback. Unlike the feedback based on the text content 320, which is provided to different elements of the content generators shown in FIGS. 2B and 2D that utilize text-based information, the media content 340 may be provided to elements of the content generator of FIG. 2C-2D that utilize media content information as input or feedback, such as the media content augmentation engine 240, the media content enrichment engine 250, and the animation engine 260. Each of these elements may be configured to generate additional candidate image content 320 based on the media content provided or received as feedback. The feedback mechanisms shown in FIG. 3A may be used to facilitate an iterative process in which changes are made to the text content 320 and those changes are propagated to the text-based elements provided as input to the content generator, such as the text amplification engine 220 (e.g., for text expansion/simplification/user edits), the media content generation engine 230 (e.g., for text to image processing), and the media content augmentation engine 240 (e.g., to specify text-based alterations to be made to an image). New image content may then be generated as a result of the text-based feedback. For example, the media content generation engine 230 may generate a new candidate image or images based on modified text. The new image(s) may be presented to a user (e.g., as one of the previews 272 of FIG. 2). The new image(s) may also be provided as feedback to the media content augmentation engine 240 (e.g., for generation of an augmented image based on the modified text and the new image(s)), to the media content enrichment engine 250 (e.g., for generation of additional text content based on the new image), and the animation engine (e.g., for generation of additional animation data based on the new image). With each iteration the resulting image content may be brought closer to the user's specifications or desired image content, thereby providing a mechanism for a user to utilize text-to-media content techniques (e.g., according to the concepts described with reference to the elements illustrated in FIG. 2B), media content-to-media content techniques (e.g., according to the concepts described with reference to the elements illustrated in FIG. 2B), or both text-to-media content and media content-to-media content techniques (e.g., according to the concepts described with reference to the elements illustrated in FIG. 2D) to generate media content that matches the user's vision for the content being generated, as opposed to being stuck with whatever the initial result is and which is likely not close to the user's vision.

Figure 3B:
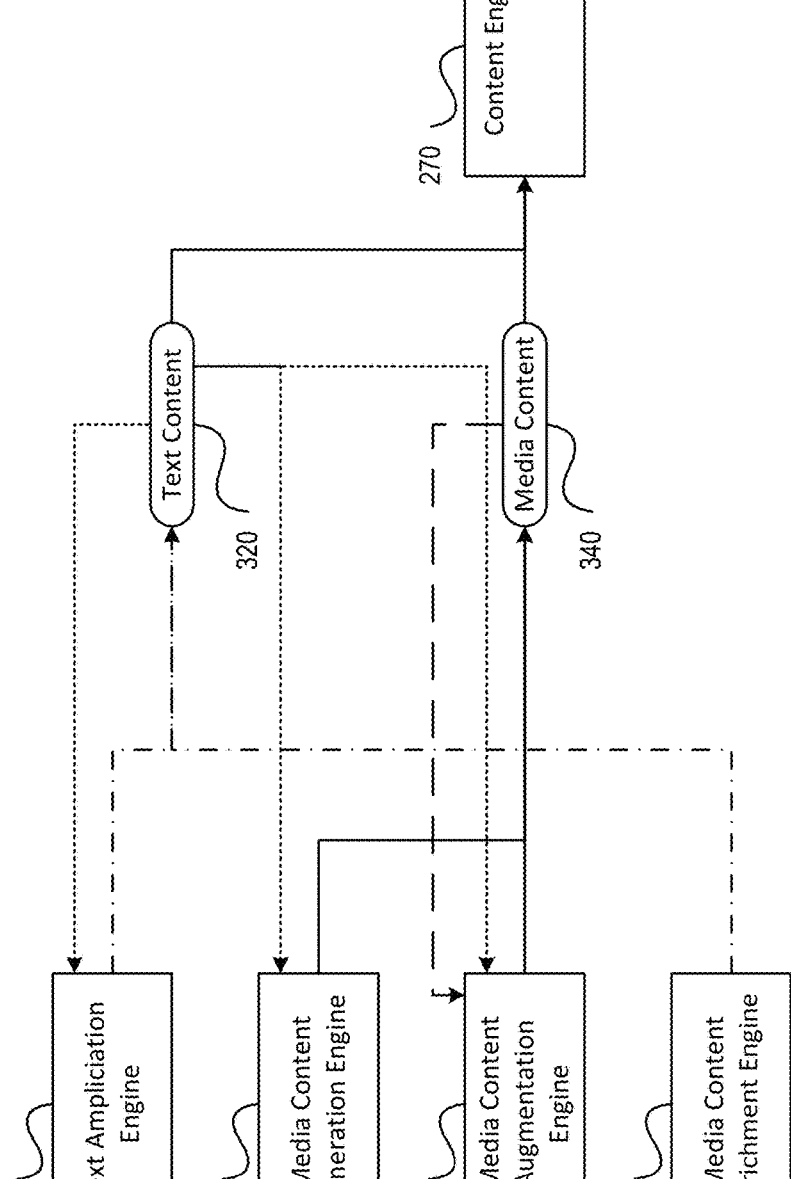
FIG. 3B is a diagram illustrating aspects of a language configurator supporting a process for generating media content in accordance with aspects of the present disclosure.

Referring to FIG. 3B, a diagram illustrating aspects of a language configurator supporting a process for generating media content in accordance with aspects of the present disclosure. In an aspect, the exemplary components and data flows shown in FIG. 3B may be referred to as a language configurator. In the non-limiting example shown in FIG. 3B, the language configurator is shown to utilize the text content 320 and the media content 340, which correspond to the outputs of the text amplification engine 220, the media content generation engine 230, the media content augmentation engine 240, and the media content enrichment engine 250. However, it should be understood that one or more of these components may be omitted from a language configurator if desired or other components may be added, such as the outputs of the content engine 270, the processing engine 280 of FIG. 2, or other components incorporated into a content generation system operating in accordance with the present disclosure. As additionally shown in FIG. 3B, the language configurator may also utilize information associated with the feedback provided based on the text content 320 and the image content 340. As briefly explained above, the language configurator may support an iterative process for refining the language of a prompt or other input use for performing a text-to-image (or speech-to-image) content generation process in accordance with the present disclosure. Further details of the functionality of the language configurator are illustrated and described in more detail with reference to FIGS. 3D and 3E below.

Figure 3C:
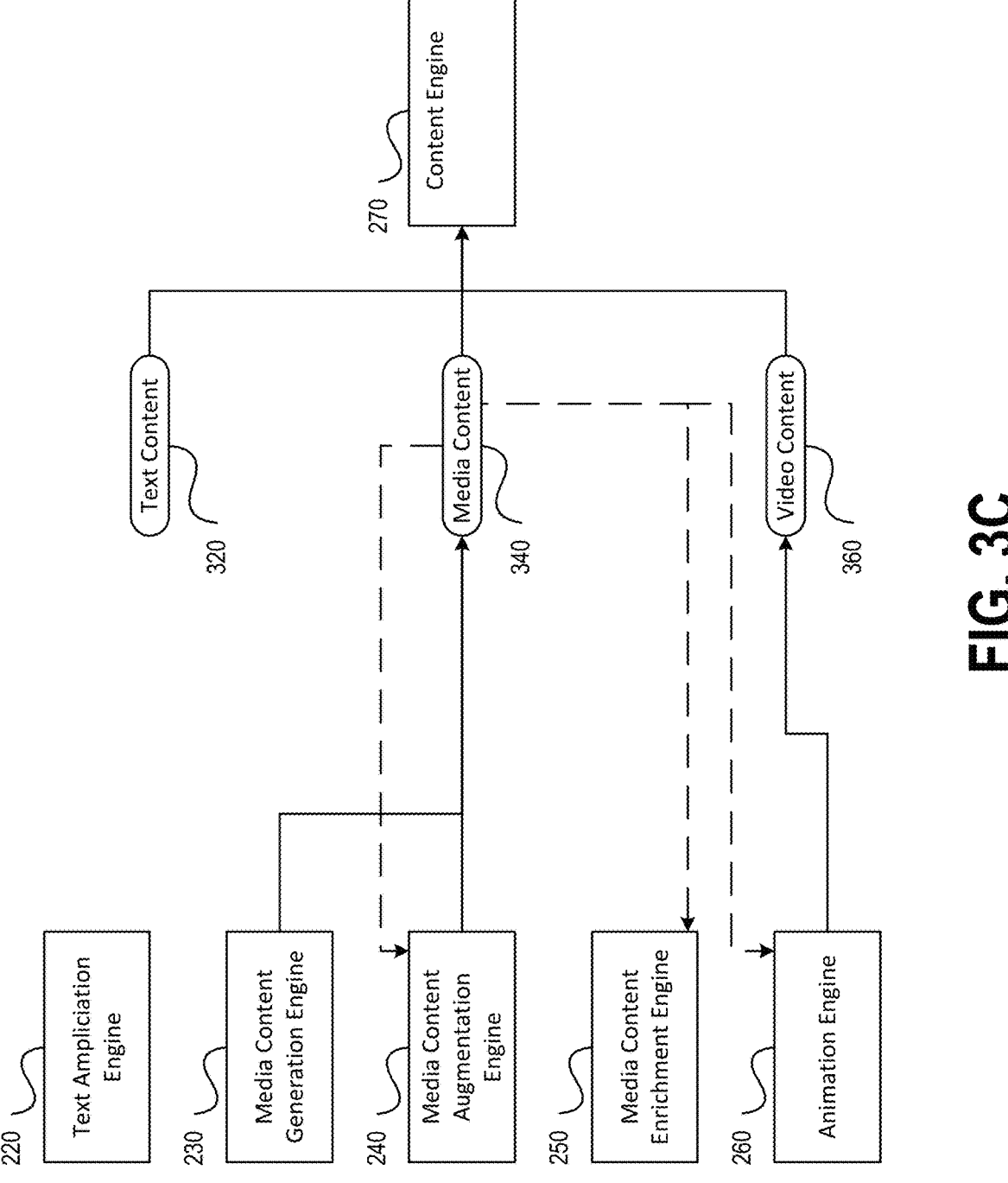
FIG. 3C is a diagram illustrating aspects of an image configurator supporting a process for generating media content in accordance with aspects of the present disclosure.

Referring to FIG. 3C, a diagram illustrating aspects of an media content configurator supporting a process for generating media content in accordance with aspects of the present disclosure is shown. In an aspect, the exemplary components and data flows shown in FIG. 3C may be referred to as a media content configurator. In the non-limiting example shown in FIG. 3C, the media content configurator is shown to utilize the image content 340, which corresponds to the outputs of the media content generation engine 230 and the media content augmentation engine 240. However, it should be understood that one or more of these components may be omitted from a media content configurator if desired or other components may be added, such as the outputs of the animation engine 250 (e.g., the video content 360), outputs of the content engine 270, the processing engine 280 of FIG. 2, or other components incorporated into a content generation system operating in accordance with the present disclosure. As additionally shown in FIG. 3C, the media content configurator may also utilize information associated with the feedback provided based on the media content 340. As briefly explained above, the media content configurator may support an iterative process for refining the properties of the media content generated in accordance with the present disclosure. In an aspect, the media content configurator may also be used to support generation and refinement of the text content 320, such as by providing images having improved properties to the media content augmentation engine 240 for media content-to-text processing and/or to the media content enrichment engine 250, as described above. Further details of the functionality of the media content configurator are illustrated and described in more detail with reference to FIGS. 3D and 3F below.

Figure 3D:
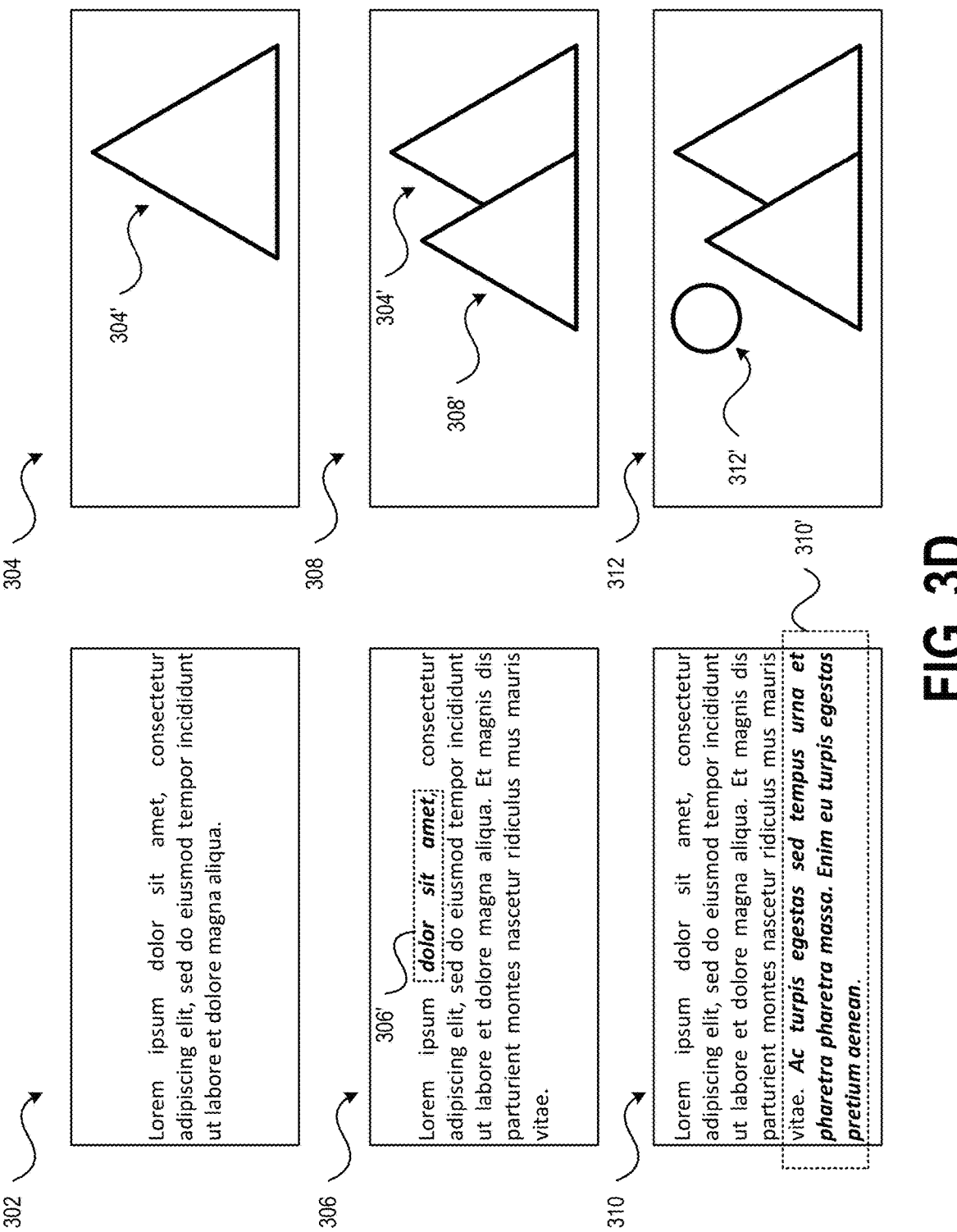
FIG. 3D is a diagram illustrating aspects of using a language configurator and an image configurator to generate media content in accordance with aspects of the present disclosure.

Referring FIG. 3D, a diagram illustrating aspects of using a language configurator and a media content configurator to generate media content in accordance with aspects of the present disclosure is shown. As briefly explained above, the language configurator provides functionality to support configuration of the language included in the text content (e.g., a prompt) used in connection with an image generation and the media content configurator provides functionality to support configuration of properties of images generated by an image generation process and may also support generation of additional text content. In the example shown in FIG. 3D, three sets of text content are shown as text content 302, 306, 310, and three sets of media content are shown as media content 304, 308, 312. It is noted that while FIG. 3D shows only three sets of text content and three sets of media content, operations in accordance with aspects of the present disclosure may result in generation of less than three sets of text/media content or more than three sets of text/media content.

In the example shown in FIG. 3D, the text content 302 corresponds to text content used to generate the media content 304; the text content 306 corresponds to text content used to generate the media content 308; and the text content 310 corresponds to text content used to generate the image content 312. For example, the text content 302 may correspond to text content (e.g., text content 214 of FIGS. 2A, 2B, 2D) initially input by a user. As explained above with reference to FIG. 2, the text content 302 may be input by a user via typing into a graphical user interface or as audio content (e.g., speech content) that is processed using a S2T engine (e.g., the S2T engine 212 of FIG. 2).

As explained above with reference to FIGS. 2A-2D, the text content may be provided as an input to the text amplification engine 220, the media content generation engine 230, and the media content augmentation engine 240 for processing. The media content 304 may correspond to an image generated based on the text-to-image processing provided by the media content generation engine 230. In the example of FIG. 3D, the media content 304 is an image of a mountain 304'. The image content 304 may be presented to a user (e.g., as a preview 272) and the user may determine whether the image content 304 reflects the content the user is trying to describe via the text content 302. Using presently available techniques, the user would not be able to gain any insights into how the text content 302 should be modified if the image content 304 does not closely resemble the content the user is trying to describe. However, the user may utilize the functionality of a language configurator in accordance with aspects of the present disclosure to gain insights into configuration of the text content 302 to improve the similarity between or the degree to which the image content generated based on the text content 302 matches the user's vision.

For example, the user may modify a portion 306' of the text content 302 to produce text content 306. Based on the text content 306, a modified image may be generated, shown as the image content 308. As can be seen in FIG. 3D, unlike the image content 304, the image content 308 includes two mountains, shown as the mountain 304' and a mountain 308'. If the image content 308 matches the user's vision to a satisfactory level, the user may accept the image content 308 and processing may continue as described above with reference to FIG. 2. However, if the image content 308 is not satisfactory, the user may utilize other functionality of the language configurator to refine the text content 306, and as a result, the image content generated by the content generator. To illustrate, the user may utilize the text amplification engine 220 to expand the text content 306, thereby producing the text content 310, which includes additional language 310'. Using the feedback provided by the text amplification engine 220, the media content generation engine 230 may generate the image content 312, which includes the mountains of the image content 308, but also includes a sun 312'.

Figure 3E:
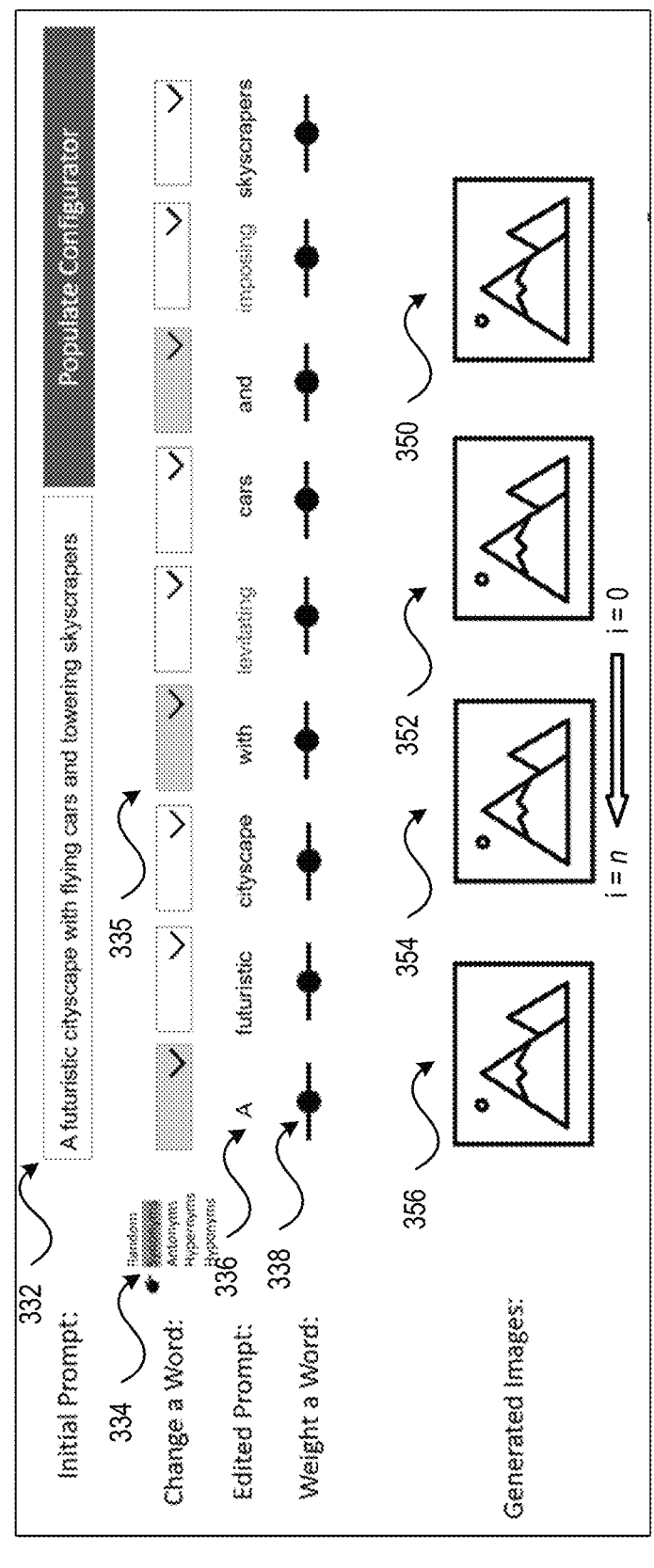
FIG. 3E is a diagram illustrating aspects of an interface providing functionality for a language configurator in accordance with aspects of the present disclosure.

Referring to FIG. 3E, a screenshot of an exemplary interface for a language configurator in accordance with aspects of the present disclosure is shown as an interface 330. The interface 330 includes a prompt area 332 configured to display the initial text content (e.g., the text content 214 of FIGS. 2A-2D). It is noted that the initial text content may be input via typing into the prompt area 332, uploading a document containing the initial text content, a speech-to-text process, another type of input mechanism, or combinations thereof. The interface 330 also includes interactive controls to manipulate and change the initial prompt. For example, the interface 330 may include selectable buttons or icons that enable a user to select the types of alternative text content the user would like to use to modify the prompt, such as synonyms, antonyms, hypernyms, hyponyms, random words, etc. The user may select one of the interactive elements to identify a particular type of language modification to be made to the prompt, such as to select synonyms to indicate the user desires to replace one or more words of the prompt 332 with a synonym. To execute the text content modification, the interface 330 may include interactive elements 335, shown as dropdown menus, that enable the user to select which word in the prompt the user would like to change, and selection of one of the interactive elements 335 may display a list of words that may be selected by the user to change the prompt, such as a list of synonyms for the particular word the user would like to change. As noted in FIG. 3E, other words besides synonyms may also be utilized to populate the suggested words, such as random words, antonyms, hypernyms, hyponyms, and the like. As the user makes changes to the prompt via the interactive elements 334, 335, the modified prompt may be displayed to the user, as shown at prompt 336. In addition to manipulation of the words included in the prompt 332, the interface 330 may also provide interactive elements, shown as slider controls 338, to apply a weight to each of the words.

As explained above, as changes to the prompt 332 and/or the modified prompt 336 are made, one or more new pieces of image content may be generated, shown in FIG. 3E as image content 350, 352, 354, 356. Each of the pieces of image content may correspond to a particular prompt version. For example, the initial image 350 may be generated at a time t=0 (i.e., when the initial prompt is received), and each of the image 352-356 may correspond to an image generated based on changes to the prompt made using the functionality of the interface 330. This process may continue until a time t=n, which correspond to a time when a stop criterion is satisfied. As a non-limiting example, the stop criterion may be when the image content output based on the prompt sufficiently matches the user's vision of what the prompt is describing.

Figure 3F:
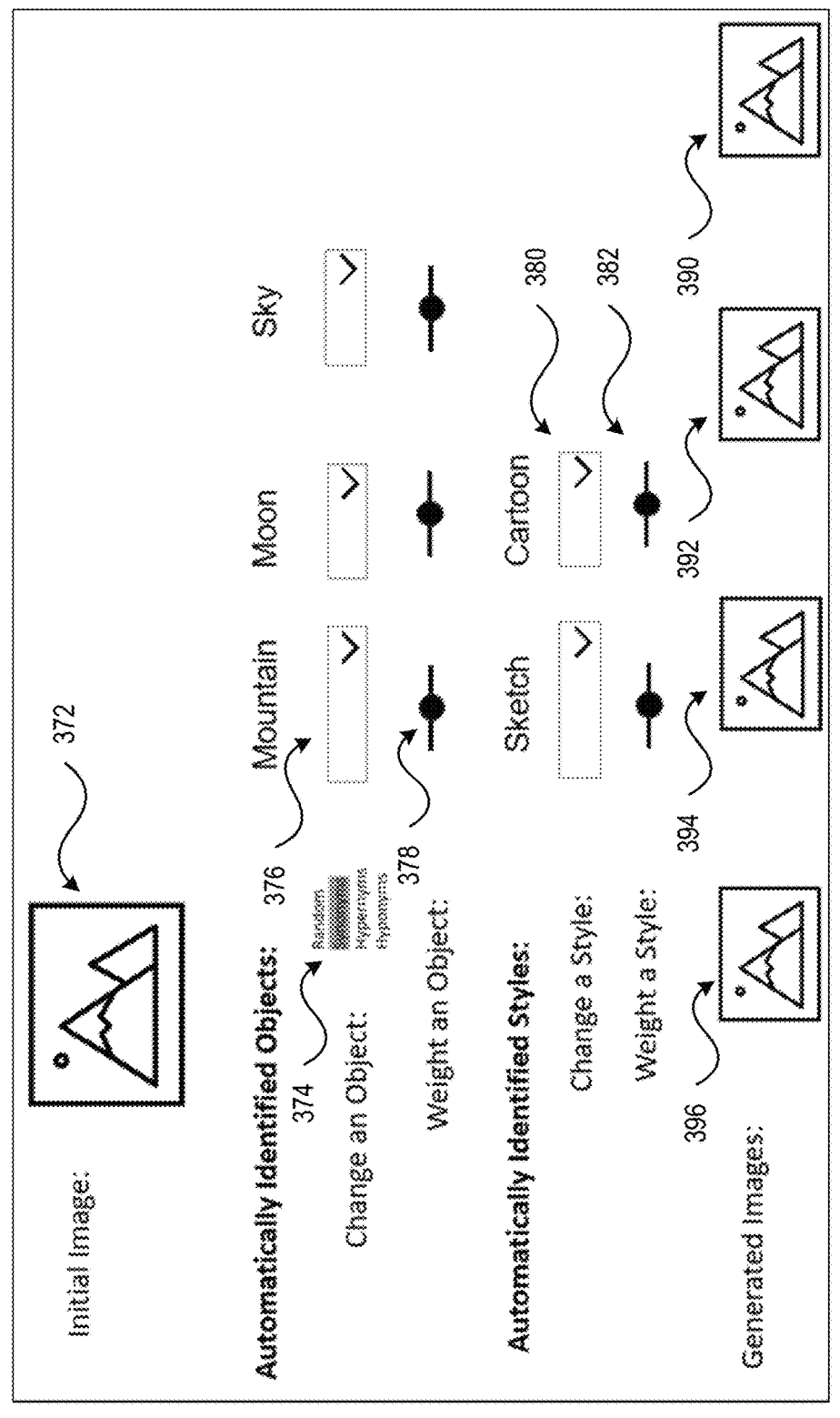
FIG. 3F is a diagram illustrating aspects of an interface providing functionality for an image configurator in accordance with aspects of the present disclosure.

Referring to FIG. 3F a screenshot of an exemplary interface for a media content configurator in accordance with aspects of the present disclosure is shown as an interface 370. The interface 370 includes an image viewing area 372 configured to display the initial image (e.g., the image 350 of FIG. 3E). The interface 370 also includes interactive controls to manipulate and change properties and content of the image. For example, the interface 370 may include interactive elements 374, shown as selectable buttons or icons, that enable a user to select the types of alternative terms the user would like to use to modify the image, such as synonyms, antonyms, hypernyms, hyponyms, random words, etc. The user may select one of the interactive elements 374 to identify a particular type of language modification to be made to modify the types of objects present in the image (e.g., based on object information provided by the media content enrichment engine 250 of FIG. 2), such as to select synonyms to indicate the user desires to replace terms for one or objects in the image with a synonym. To execute the term modification, the interface 370 may include interactive elements 376, shown as drop-down menus, that enable the user to select which term for an object depicted in the image the user would like to change, and selection of one of the interactive elements 376 may display a list of terms that are selected by the user to change the term used to identify one or more objects in the image, such as a list of synonyms for the particular object the user would like to change. As the user makes changes via the interactive elements 374 and 376, a modified image may be displayed to the user. For example, in FIG. 3E, images 390, 392, 394, 396 are shown. Each of the images 390-396 may correspond to a modified version of the image shown in display area 372 based on configuration changes made using the interface 370 of a media content configurator operating in accordance with the concepts disclosed herein. In addition to manipulation of the terms for the object included in the image, the interface 370 may also provide other interactive elements. For example, the user may be able to change one or more styles for the image via interactive elements 380 and may also be able to apply weights to multiple styles via interactive elements 382, shown as slider controls. As an illustrative example, the styles shown in FIG. 3F includes "Sketch" and "Cartoon". If the user desires a more cartoony style, the user can increase the weight applied to the cartoon style and decrease the weight of the sketch style via the interactive elements 382. Furthermore, the user may select a different style, such as a "Realistic" style to change the image content.

As can be appreciated from the description above, the language configurator enables a user to more readily understand and obtain insights into how language changes made to the text content used by image generation processes in accordance with the present disclosure result in changes to the image content that is produced. Such insights can help the user make more intelligent changes to the text content to bring the image content into alignment with the vision of the user more rapidly and achieve a higher quality overall image as a result. Furthermore, it should be understood that the insights into configuration of the language of a prompt or text input provided by the language configurator may be used for more than improving generation of images. For example, the insights may be used to better understand languages and linguistics. Additionally, the insights may be used to better understand how arrangements of text can be interpreted by AI algorithms, thereby enabling the design of training data sets that may improve the ability of AI algorithms to interpret and/or understand text content, such as improving sentiment-based or context-based natural language processing algorithms and AI models. Furthermore, the media content configurator provides functionality (e.g., via the interface 370 of FIG. 3F) for rapidly manipulating properties of the image content generated in accordance with the concepts disclosed herein. For example, the user can change objects or properties of objects depicted in the image content, a rendering style applied to the image content, or other changes. In an aspect, the changes made using the functionality provided by the language configurator and/or the media content configurator may be fed back into one or more components of a content (e.g., via the feedback mechanisms explained above with reference to FIG. 3A), thereby enabling rapid generation and refinement of content in an automated or semi-automated manner. It is noted that the exemplary elements of the interfaces 330, 370 described above with reference to FIGS. 3E and 3F have been provided for purposes of illustration, rather than by way of limitation and that additional interactive elements and control may be provided by interfaces providing the functionality described herein with reference to the language configurator and the image configurator as desired.

It is noted that the various operations, processes, and elements described and illustrated with reference to FIGS. 2A-3F have been provided to illustrate exemplary processes that may be used to generate media content in accordance with aspects of the present disclosure. However, other processing flows may be utilized by a content generator operating in accordance with the present disclosure, such as the content generator 120 of FIG. 1. For example, a content generator may be created that does not include one or more of the elements or processes shown in FIGS. 2A-3F, or may include additional elements not shown in FIGS. 2A-3F (e.g., graphical user interfaces for enabling a user to interact with various functionalities of a content generator), or other modifications. For example, a content generator in accordance with the present disclosure may not include one or more of the S2T engine 212, the media content augmentation engine 240, the media content enrichment engine 250, the animation engine 260, or combinations thereof. Furthermore, it is noted that the functionality provided by the text amplification engine 220, the media content generation engine 230, and the content engine 270 (e.g., preview functionality) may provide functionality that may be referred to as a language configurator, since the functionality of these elements is designed to configure text content (e.g., prompts) to edit media content or for other purposes (e.g., to understand how language concepts translates to visual elements or other purposes). Similarly, the functionality of the media content augmentation engine 240, the media content enrichment engine 250, and the content engine 270 (e.g., preview functionality) may provide functionality that may be referred to as a media content configurator, since the functionality of these elements is designed to configure properties of images and media content to produce other media content and text. As can be appreciated from the description of these various components above, the language configurator functionality and the media content configurator functionality may be used individually or together in combination to generate media content in accordance with the concepts described herein.

Referring to FIG. 4, a flow diagram illustrating an exemplary method for performing a content generation process in accordance with embodiments of the present disclosure is shown as a method 400. In an aspect, the method 400 may be performed by a content generation device, such as any of the content generation device 110 of FIG. 1 and/or the content generator functionality illustrated and described with reference to FIGS. 2A-3F. Steps of the method 400 may be stored as instructions (e.g., the instructions 116, 136 of FIG. 1) that, when executed by one or more processors (e.g., the one or more processors 112, 132 of FIG. 1), cause the one or more processors to perform the steps of the method 400.

At step 410, the method 400 includes receiving, by one or more processors, an input dataset comprising first information. As explained above, the first information may include textual data (e.g., the text content 214 of FIG. 2). The input dataset may include image data (e.g., the image content 216 of FIG. 2). Additionally, the input dataset may include other types of information, such as motion data, video data, feedback data (e.g., the feedback described above with reference to FIG. 3), gesture data, or other types of information. In an aspect, the textual information may be received as speech data and converted to a textual representation, as described above with reference to FIGS. 1 and 2. At step 420, the method 400 includes executing, by the one or more processors, one or more artificial intelligence algorithms against the textual data to generate amplified text content. As explained above with reference to the text amplification engine 220 of FIGS. 2 and 3, the one or more artificial intelligence algorithms may be configured to expand the textual content, simplify the textual content, or both. Additionally, the one or more AI algorithms may be configured to convert the textual information (or the amplified textual content) to a prompt.

At step 430, the method 400 includes generating, by the one or more processors, an image based on the amplified text content. As explained above with reference to the media content generation engine 230 of FIG. 2, the image may be generated using an AI algorithm configured to convert text-based content to an image. In an aspect, as indicated by arrow 422, the executing and the generating may be performed in an iterative manner until a stop criterion is satisfied, such as when the image resulting from steps 420, 430 reflects the specifications of the user (e.g., the user's vision of the content of the text-based content). In an aspect, the method may additional include other operations, such as the operations described above with reference to the media content augmentation engine 240, the media content enrichment engine 250, and the animation engine 260 of FIGS. 2 and 3. In an aspect, a preview of the image generated by steps 420, 430, and possibly other operations as described herein, may be presented to the user to enable the user to view the image content derived from the text-based information. Additionally, the user may be enabled to modify the textual content in between one or more iterations of steps 420, 430, as described above.

At step 440, the method 400 includes extracting, by the one or more processors, 3-dimensional (3D) data from at least a final image output in a last iteration of the executing and the generating. In an aspect, the 3D data may be extracted as described above with reference to the content engine 270 of FIG. 2. At step 450, the method 400 includes creating, by the one or more processors, a 3D model based on the 3D data extracted from at least the final image. As explained above with reference to the processing engine 280 of FIG. 2, the 3D model may include a 3D (or 2.5D) representation of the content depicted in the 2D image(s) generated using the method 400 (e.g., at steps 420, 430) and may be suitable for integration with an external system or platform (e.g., the metaverse, a video game, etc.) or use by an external device (e.g., a 3D printer).

As shown above, the method 400 provides a new and improved technique for generating media content (e.g., 2D images, 2.5 or 3D models, animations, etc.) based on textual information. Moreover, the method 400 enables a user to obtain insights into how changes in the textual information provided to the method 400 impacts the resulting image content generated from the input dataset, thereby enabling media content to be generated in a manner that more accurately reflects the specifications or vision of the user without requiring the user to have expertise in 2D or 3D modelling and illustration tools. Furthermore, the text-to-media content techniques of the method 400 improve over prior techniques, which operate in a take-it-or-leave-it manner in which the user must accept the image generated from a text-based input or create a new text-based input without having any insights into how to alter the text-based input to achieve an improved image result. Accordingly, it should be understood that the method 400 and the systems and functionality supporting the method 400 (e.g., the system 100 of FIG. 1 and the exemplary operations described with respect to the content generator elements of FIGS. 2 and 3) represent a technical improvement to media content generation tools and the manner in which text-to-image processing can be performed.

Figure 5:
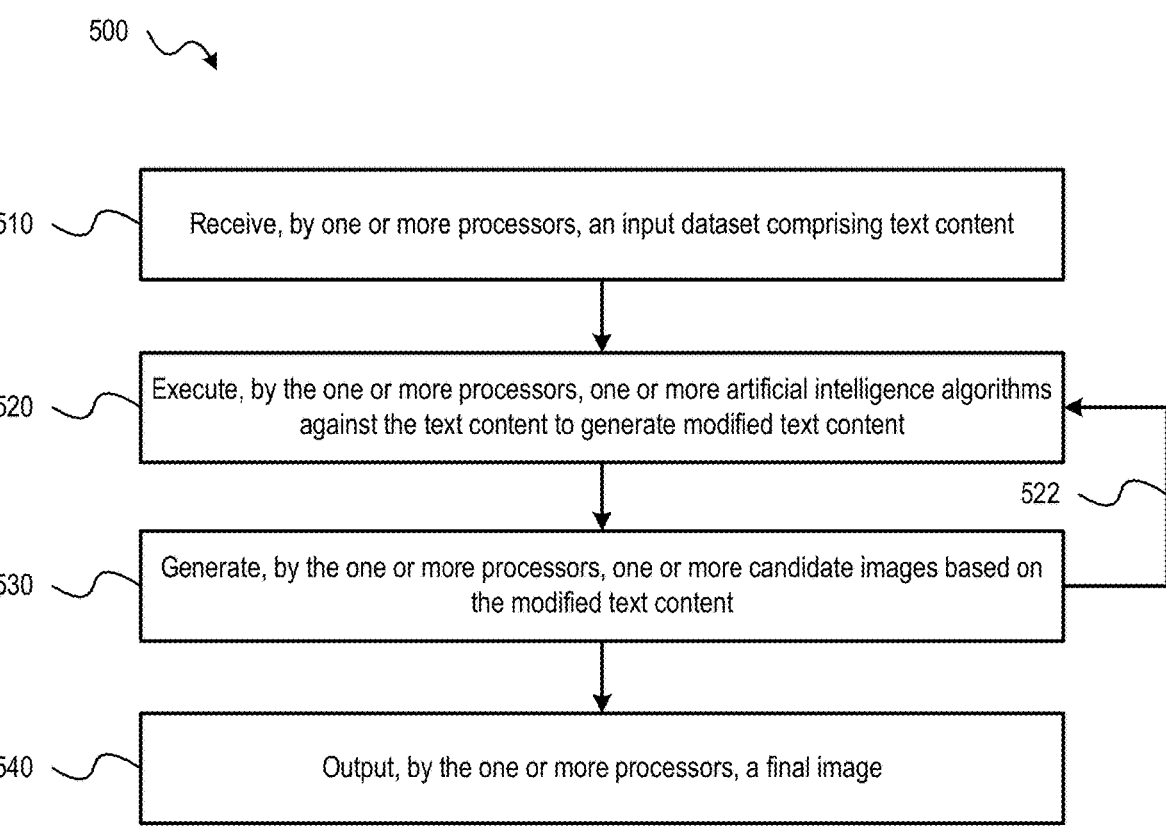
FIG. 5 is a flow diagram illustrating another exemplary method for generating media content in accordance with embodiments of the present disclosure.

Referring to FIG. 5, a flow diagram illustrating an exemplary method for performing a content generation process in accordance with embodiments of the present disclosure is shown as a method 500. In an aspect, the method 500 may be performed by a content generation device, such as any of the content generation device 110 of FIG. 1 and/or the content generator functionality illustrated and described with reference to FIGS. 2A-3F. Steps of the method 500 may be stored as instructions (e.g., the instructions 116, 136 of FIG. 1) that, when executed by one or more processors (e.g., the one or more processors 112, 132 of FIG. 1), cause the one or more processors to perform the steps of the method 500.

At step 510, the method 500 includes receiving, by one or more processors, an input dataset. The input dataset may include text content. At step 520, the method 500 includes executing, by the one or more processors, one or more artificial intelligence algorithms against the text content to generate modified text content. The one or more artificial intelligence algorithms may be configured to expand the text content, simplify the text content, or both, as described above with reference to the text amplification engine 220 and the language configurator of FIG. 3E. In an aspect, the modified text content may be generated using functionality provided by a language configurator configured in accordance with the concepts described herein. For example, the method 500 may include presenting a language configurator interface, such as the language configurator interface of FIG. 3E, providing a first set of interactive text control elements for controlling generation of the modified textual content. The method 500 may include receiving inputs via one or more of the interactive text control elements of the language configurator interface. The inputs may be provided as feedback and a modified image may be generated based on the inputs/feedback, as described above. In an aspect, the feedback may include one or more pieces of text, and modified text content of a particular iteration may be generated based on the one or more pieces of text, such as by applying a text amplification engine to the feedback to generate additional modified text. As explained above with reference to FIG. 3E, the interactive text control elements of the language configurator may include interactive elements configured to control types of words used to modify a prompt defined by the textual data or the modified text content, words included in the prompt, a weight of one or more words included in the prompt, or a combination thereof. In an aspect, the one or more artificial intelligence algorithms may be configured to analyze an input image included in the input dataset or an image provided as feedback and generating additional text content based on the analyzing. The additional text content may include information associated with objects present in the image, properties of the image, or both, as described above with reference to FIGS. 2A-2D. In an aspect, the executing is based on the modified text content and the additional text content for at least one iteration.

At step 530, the method 500 includes generating, by the one or more processors, one or more candidate images based on the modified text content. At step 550, the method 500 includes outputting, by the one or more processors, a final image. As explained above, the final image may correspond to a particular candidate image of the one or more candidate images generated in accordance with the techniques described herein. For example, the final image may be generated based on particular modified text content generated using the functionality of the language configurator and related functionality and processes described and illustrated with reference to FIGS. 2A-3F. In the method 500 steps 520-540 (e.g., the executing, generating, and outputting steps) may be performed in an iterative manner until a stop criterion is satisfied, such as when the user is satisfied with the media content generated by the method 500. Additionally or alternatively, the stop criterion may be a threshold number of iterations, usage of a threshold number of computing resources or processing cycles, time (e.g., 5 minutes, 10 minutes, 1 hour, etc.), or another criterion.

Although not shown in FIG. 5, it should be understood that the method 500 may include extracting, by the one or more processors, 3-dimensional (3D) data from the final image output in a last iteration of the executing and the generating, and creating, by the one or more processors, a 3D model based on the 3D data extracted from the final image, as described above. In an aspect, the input dataset received at step 510 may include media content and the method 500 may include presenting a media content configurator interface, such as the media content configurator interface of FIG. 3F, providing interactive image control elements for controlling generation of the modified textual content, the one or more candidate images, or both. As explained above, the media content configurator interface may receive inputs via one or more of the interactive image control elements and a modified image is generated based on the inputs. The interactive image control elements of the media content configurator interface may include interactive elements configured to control one or more styles for the image content, interactive elements configured to control a weight of the one or more styles for the image content, objects depicted within the image content, a weight of each object depicted within the image content, a term configuration element for controlling terms used to modify objects depicted within the image content, or a combination thereof, as explained above with reference to FIG. 3F.

Figure 6:
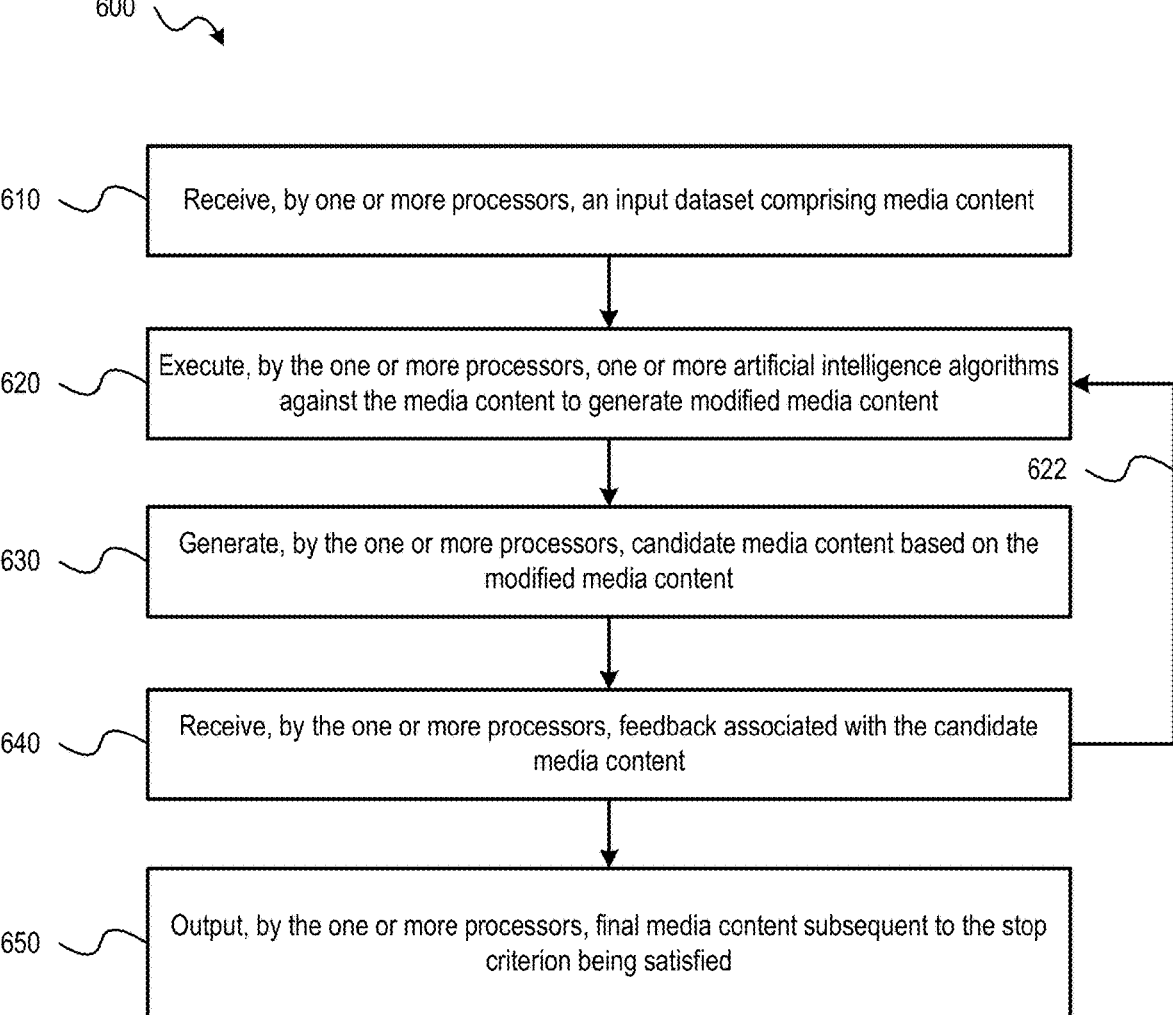
FIG. 6 is a flow diagram illustrating another exemplary method for generating media content in accordance with embodiments of the present disclosure.

Referring to FIG. 6, a flow diagram illustrating an exemplary method for performing a content generation process in accordance with embodiments of the present disclosure is shown as a method 600. In an aspect, the method 600 may be performed by a content generation device, such as any of the content generation device 110 of FIG. 1 and/or the content generator functionality illustrated and described with reference to FIGS. 2A-3F. Steps of the method 600 may be stored as instructions (e.g., the instructions 116, 136 of FIG. 1) that, when executed by one or more processors (e.g., the one or more processors 112, 132 of FIG. 1), cause the one or more processors to perform the steps of the method 600.

At step 610, the method 600 includes receiving, by one or more processors, an input dataset that includes media content. As explained above, the media content included in the input dataset may include image content, video content, motion data, or other types of information.

At step 620, the method 600 includes executing, by the one or more processors, one or more artificial intelligence algorithms against the media content to generate modified media content. At step 630, the method 600 includes generating, by the one or more processors, candidate media content based on the modified media content. At step 640, the method 600 includes receiving, by the one or more processors, feedback associated with the candidate media content, wherein the executing and the generating are performed in an iterative manner until a stop criterion is satisfied, and wherein additional candidate media content is generated during each iteration based on the feedback; and At step 650, the method 600 includes outputting, by the one or more processors, final media content subsequent to the stop criterion being satisfied. As explained above, the stop criterion may be when the user is satisfied with the picture, when a threshold number of iterations of steps 620-640 have been performed, a period of time, or another criterion. Although not shown in FIG. 6, in an aspect, the method 600 may include extracting, by the one or more processors, 3-dimensional (3D) data from at least a final image output in a last iteration of the executing and the generating, and creating, by the one or more processors, a 3D model based on the 3D data extracted from at least the final image. As explained above, in an aspect, the extracting may include generating 2.5 dimensional (2.5 D) data from the final image, and wherein the 3D data is extracted based on the 2.5 D data. The method 600 may include outputting the 3D model to a 3D printer, a video game, another device or system, or a combination thereof.

In an aspect, the method 600 may include presenting a media content configurator interface, such as the media content configurator interface of FIG. 3F, providing interactive image control elements for controlling generation of modified textual content based on input text content, as described above, the one or more candidate images, or both. As explained above, the media content configurator interface may receive inputs via one or more of the interactive image control elements and a modified image is generated based on the inputs. The interactive image control elements of the media content configurator interface may include interactive elements configured to control one or more styles for the image content, interactive elements configured to control a weight of the one or more styles for the image content, objects depicted within the image content, a weight of each object depicted within the image content, a term configuration element for controlling terms used to modify objects depicted within the image content, or a combination thereof, as explained above with reference to FIG. 3F.

At step 710, the method 700 includes receiving, by one or more processors, input data via a content generation interface, wherein the input data comprises text content, media content, or both. At step 720, the method 700 includes executing, by the one or more processors, one or more artificial intelligence algorithms against the input data to generate one or more pieces of candidate media content and at step 730, outputting, by the one or more processors, the one or more pieces of candidate media content to the content generation interface. As explained above, the content generation interface may include interactive image configurator control elements for controlling generation of the one or more pieces of candidate and the additional media content.

Inputs may be received via one or more of the interactive image configurator control elements, and at least a portion the inputs may be used as feedback to the one or more artificial intelligence algorithms to generate the additional candidate media content. It is noted that particular media content generated during a particular iteration may be different from other media content generated in a prior or subsequent iteration based on the received feedback. In an aspect, the interactive image configurator control elements comprise interactive elements configured to control one or more styles for the image content, interactive elements configured to control a weight of the one or more styles for the image content, objects depicted within the image content, a weight of each object depicted within the image content, a term configuration element for controlling terms used to modify objects depicted within the image content, or a combination thereof, as described above with reference to FIGS. 3A-3F.

At step 740, the method 700 includes receiving, by the one or more processors, feedback associated with the one or more pieces of candidate media content via the content generation interface. As explained above, the executing and the outputting (e.g., steps 720, 730) may be performed in an iterative manner until a stop criterion is satisfied and additional candidate media content may generated during each iteration based on the feedback. At step 750, the method 700 includes outputting, by the one or more processors, final media content subsequent to the stop criterion being satisfied. Where the input data includes text content, the interactive image configuration control elements may include control elements configured to modify the text content, such as the interactive elements described above with reference to the language configurator of FIG. 3E, and the modified text content may be utilized as feedback to produce additional candidate media content during execution of the one or more artificial intelligence algorithms in a subsequent iteration. Where the input data received at step 610 includes media content, the interactive media content configuration control elements include control elements configured to modify the media content, such as the interactive control elements described with respect to the media content configurator of FIG. 3F. As explained above, the modified media content may be utilized as feedback to produce the additional candidate media content during execution of the one or more artificial intelligence algorithms in a subsequent iteration. At step 750, the method 700 includes outputting, to the content generation interface, the one or more candidate images generated for each iteration of the executing and the generating.

As can be appreciated from the foregoing, the method 400-700 provide new techniques for utilizing generative AI models and processes to produce media content. The techniques disclosed herein, which are described above with reference to FIGS. 1-7, enable new insights to be obtained when utilizing generative AI techniques and models that enable media content to be generated more quickly and efficiently as compared to prior techniques. For example, a language configurator in accordance with the present disclosure may enable a user to understand how changes to language in a prompt can impact the images produced and an image configurator in accordance with the present disclosure may enable media content to be tuned and modified in a more controlled manner Additionally, the language and media content configurators may be configured to automatically provide suggestions for modifying the inputs used to generate the media content, where the modifications may be provided as feedback to produce additional media content that may more closely resemble the desired media content of the user. Such capabilities may reduce the number of iterations that need to be performed to obtain a final piece of media content (i.e., media content satisfactory to the user), thereby reducing the amount of computing resources required to generated media content using generative AI techniques and models, and may also aid in designing better prompts in the future.

It is noted that additional features and functionality may be provided by systems operating in accordance with the present disclosure. For example, and referring back to FIG. 1, the content generation device 110 of the system 100 may be communicatively coupled to one or more data sources 160. The one or more data sources may include media content, text content, or both, that may be used to train the one or more artificial intelligence algorithms and the language and media content configurators utilized to generate media content using the techniques described above. For example, the data source may be a database of media content from a business or entity. The media content of the database may be used to train one or more artificial intelligence algorithms (e.g., a text-to-image algorithm, a media-to-media or image-to-image algorithm, etc.) such that the one or more artificial intelligence algorithms learn to generate media content that fits the style of the business or entity. Subsequently, input data may be provided to the content generation device requesting generation of media content in the style of the business or entity and the artificial intelligence algorithms may generate media content according to the input data that matches the style learned from training the artificial intelligence algorithms on the database of media content. It is noted that the above-described functionality for generating media content according to a particular style may be based on existing media content for a particular time period. For example, the style may be media content of the entity from a particular time period (e.g., the 1950s) and a generative AI model (e.g., a model used by the media content generation engine 230) may be trained to generate media content that is similar to the style of the media content from the designated time period. Thus, it is to be understood that style may include specific style types (e.g., style guidelines, genres of media content over time, and the like) or may include more abstract style enforcement (e.g., a model may be trained on a corpus of media content for an entity to enable the model to generate media content that is characteristic of the entity, such as to generate content that has Nikeness or content that looks and feels like Nike).

Additionally or alternatively, the media content stored in the data source 160 may be provided as an input (e.g., the media content 216) and may be used to generate new media content using the various techniques described above. For example, suppose that the functionality of the content generation device 110 was used to design a new advertisement for particular geographic region. To generate media content for the advertisement, a portion of the media content stored in the data source 160 may be provided as input media content, along with a prompt (e.g., text content) providing details about the desired advertisement. The portion of the media content of the data source 160 used as the input media content may correspond to one or more advertisements or other types of media content from particular geographic region. By using such media content as input, the functionality provided by the content generation device may be capable of generating media content tailored to the particular geographic region. Furthermore, using the iterative techniques and functionality provided by the language and media content configurators, the user may generate modified input data that may be used in a subsequent iteration to refine the output media content until the desired media content is generated.

To illustrate, suppose the advertisement was intended for a campaign to sell shoes and the target geographic region was Brazil. The prompt may specify that an advertisement for selling shoes in Brazil is to be generated. The media content selected from the data source 160 may correspond to advertisements that have been previously used to sell shoes in Brazil. Using these inputs, the media content generation functionality may generate an advertisement that incorporates style and other visual and textual elements known to be utilized in shoe advertisement in Brazil. As noted above, multiple iterations may be performed with each iteration refining or tuning the input data used to generate the media content based on the functionality of the language configurator, the media content configurator, or both. For example, a first iteration may not produce media content suitable for use as an advertisement. However, the language configurator functionality may provide suggestions for modifying the text content of the prompt to produce different media content that may be more close to the desired media content. For example, the text amplification engine 220 may generate suggestions for modifying the text content, the media content generation engine 230 may generate an initial set of one or more candidate pieces of media content based on the initial inputs, and the media augmentation engine 240 may use the input media content to extract features from the media content obtained from the data source, which may be incorporated as feedback for a subsequent iteration. Similar processing may be performed, as desired, using the media content enrichment engine 250 and the animation engine 260. As explained above, during each iteration the feedback provided by the various engine of the language and media content configurators may refine and tune the inputs used to generate the media content so that each iteration the candidate media content produced more closely resembles the target or desired media content. It is noted that extracting features from the input media content obtained from the data source 160 or media content provided as feedback (e.g., as part of an iterative process) using the functionality of the media content augmentation engine 240 may enable additional text content to be incorporated into the prompt provided to the media content generation engine 230 that the user may not have thought to incorporate into the input text content and which is based on the prior media content. Such prompt engineering techniques may further reduce the number of iterations required to obtain the final media content and provide additional insights into how to generate or create better prompts for a given generative model.

In addition to a user selecting and providing the input data (e.g., media content, text content, or both) to the content generation device 110, at least a portion of the input data may be selected automatically by the content generation device 110. To illustrate, where the media content is generated with the purpose of targeting a specific geographic region, such as Brazil, the specific geographic region may be specified in the input data, potentially with other parameters (e.g., classification of one or more objects or things to be depicted in the content, style of the content, etc.). The content generation device 110 may then analyze data stored at the data source 160 to determine one or more items of media content to use for generation of the media content. For example, where the media content is being generated to promote a product in Brazil, the input data may indicate a request to generate media content related to a classification of goods (e.g., shoes, clothing, vehicles, electronic devices, etc.) or services in Brazil. The content generation device 110 may then analyze sales data stored at the data source 160 to identify one or more top selling goods or services satisfying the specified classification within the target geographic region. Subsequently, the content generation device 110 may retrieve one or more pieces of media content from the data source 160 related to the one or more top selling goods or services and may provide the media content as an input to the content generator for generation of media content using the above-described techniques.

In an additional or alternative aspect, functionality provided by the content generation device 110 may be configured as a series of content generation agents. For example, the functionality provided by each of the various engines shown in FIGS. 2B-2D may implemented as agents (e.g., executable processes that may be invoked or instantiated on demand to provide various media content generation functionality in accordance with the present disclosure). The agents may include multiple agents for a single engine, where each agent corresponding to the same engine may be trained to provide different outputs for a given set of inputs. For example, agents corresponding to the media content generation engine 230 may be trained to generate media content having different styles. Where a particular style is desired during a media content generation process, the agent provide image generation associated with the particular style may be invoked to generate the media content. Similarly, agents may be trained to provide text amplification functionality in a manner that is consistent with different business or entity style guidelines. For example, a first agent may be trained to generate modified text that is configured to promote generation of media content (and text content) that is consistent with a first entity's style guidelines (e.g., use of language, permissible colors, use of logos, and the like) while a second agent may be trained to generate modified text that is configured to promote generation of media content (and text content) that is consistent with a second entity's style guidelines, which are different from the first entity's style guidelines. Using an agent-based approach may enable further customization of the content generation functionality described herein, such as having different sets of agents configured to generate content for different entities or to generate content according to different styles. In such an approach, each agent may be invoked only when called upon, and multiple agents may be nm in parallel, which may enable scalability of the functionality provided by the system 100.

In an aspect, the system 100 may also provide other types of media content generation and related functionality. For example, the media content generation techniques described herein may utilized as part of a product manufacturing process in which the media content generation is used to design new products. The output media content, which may be one or more images, video, 3D models, or other types of media content, may correspond to a new product design. Once the design is finalized (i.e., the stop criterion for the iterative media content generation process is satisfied), one or more other engines may be applied to the output media content for validation or other purposes. For example, suppose the media content was an advertisement for a new or existing product of an entity. One or more machine learning models may be trained to verify aspects related to the products of the entity, such as to determine whether a proposed product design is feasible to manufacture, matches or fits within the entity's style, or other product design related functions. Such additional machine learning models may be applies to the output media content to verify the design or other aspects of the content. If any of the design or other aspects are not satisfied, feedback from the machine learning model outputs may be provided to a content generator in accordance with the concepts described herein. The feedback from these machine learning models may then be utilized to generate additional media content that is more likely to satisfy the conditions that failed previously. Such content validation functionality may be implemented as one or more agents as described above.

As can be appreciated from the examples above, the functionality provided by the system 100 enables generation of media content using an ensemble of generative and other AI techniques and uses feedback techniques to provide improved methods for AI-assisted media content generation. As additionally shown above, the functionality of the system 100 may enable the media content generated by the content generation device to constrain the media content that is generated, such as to limit the media content to depicting content in a specific manner or to customize the media content to a particular style (e.g., a style of a business or entity) or to incorporate elements into the media content specific to a particular geographic region. Such capabilities may enable the one or more artificial intelligence algorithms to generate custom, brand-aware, and context specific content without requiring the user to be an expert in training artificial intelligence models and/or designing prompts.

Additional exemplary aspects of a content generation system in accordance with aspects of the present disclosure are shown in the attached Appendix, such as exemplary interfaces that may be used to interact with various functionalities provided by a content generation system in accordance with the concepts described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-4) may comprise processors, electronics devices, hardware devices, electronics components, logical circuits, memories, software codes, firmware codes, etc., or any combination thereof. In addition, features discussed herein relating to FIGS. 1-4 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-3 and 7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for generating media content, the method comprising:
   receiving, by one or more processors, an input dataset comprising text content;
   executing, by the one or more processors, one or more artificial intelligence algorithms against the text content to generate modified text content, wherein the one or more artificial intelligence algorithms are configured to expand the text content, simplify the text content, or both;
   generating, by the one or more processors, one or more candidate images based on the modified text content, wherein the executing and the generating are performed in an iterative manner until a stop criterion is satisfied; and
   outputting, by the one or more processors, a final image, wherein the final image corresponds to a particular candidate image of the one or more candidate images and is generated based on particular modified text content.

2. The method of claim 1, further comprising:
   extracting, by the one or more processors, 3-dimensional (3D) data from the final image output in a last iteration of the executing and the generating; and
   creating, by the one or more processors, a 3D model based on the 3D data extracted from the final image.

3. The method of claim 1, further comprising:

presenting a language configurator interface providing a first set of interactive text control elements for controlling generation of the modified textual content; and receiving inputs via one or more of the interactive text control elements, wherein a modified image is generated based on the inputs.

4. The method of claim 3, wherein the interactive text control elements comprise interactive elements configured to control types of words used to modify a prompt defined by the textual data or the modified text content, words included in the prompt, a weight of one or more words included in the prompt, or a combination thereof.

5. The method of claim 1, further comprising:

presenting an image configurator interface providing interactive image control elements for controlling generation of the modified textual content, the one or more candidate images, or both; and receiving inputs via one or more of the interactive image control elements, wherein a modified image is generated based on the inputs.

6. The method of claim 5, wherein the interactive image control elements comprise interactive elements configured to control one or more styles for the image content, interactive elements configured to control a weight of the one or more styles for the image content, objects depicted within the image content, a weight of each object depicted within the image content, a term configuration element for controlling terms used to modify objects depicted within the image content, or a combination thereof.

7. The method of claim 1, further comprising:

analyzing an input image included in the input dataset; and generating additional text content based on the analyzing.

8. The method of claim 7, wherein the additional text content comprises information associated with objects present in the image, properties of the image, or both.

9. The method of claim 7, wherein, for at least one iteration, the executing is based on the modified text content and the additional text content.

10. The method of claim 1, further comprising:

outputting the one or more candidate images generated for each iteration of the executing and the generating; receiving feedback based on the one or more candidate images, wherein additional candidate images are generated in a next iteration of the executing and the generating based at least in part on the feedback.

11. The method of claim 10, wherein the feedback comprises one or more pieces of text, the method further comprising generating the modified text content based on the one or more pieces of text received as feedback.

12. The method of claim 1, further comprising:

outputting the one or more candidate images generated for each iteration of the executing and the generating; receiving feedback based on the one or more candidate images, wherein additional candidate images are generated in a next iteration of the executing and the generating based at least in part on the feedback.

13. A method for generating media content, the method comprising:

receiving, by one or more processors, an input dataset comprising media content;

executing, by the one or more processors, one or more artificial intelligence algorithms against the media content to generate modified media content;

generating, by the one or more processors, candidate media content based on the modified media content;

receiving, by the one or more processors, feedback associated with the candidate media content, wherein the executing and the generating are performed in an iterative manner until a stop criterion is satisfied, and wherein additional candidate media content is generated during each iteration based on the feedback; and outputting, by the one or more processors, final media content subsequent to the stop criterion being satisfied.

14. The method of claim 13, further comprising:

extracting, by the one or more processors, 3-dimensional (3D) data from at least a final image output in a last iteration of the executing and the generating; and creating, by the one or more processors, a 3D model based on the 3D data extracted from at least the final image.

15. The method of claim 14, wherein the extracting comprises generating 2.5 dimensional (2.5D) data from the final image, and wherein the 3D data is extracted based on the 2.5D data.

16. The method of claim 15, further comprising outputting the 3D model to a 3D printer, a video game, or both.

17. The method of claim 13, further comprising:

presenting an image configurator interface providing interactive image control elements for controlling generation of the modified textual content; and receiving inputs via one or more of the interactive image control elements, wherein the feedback is received via at least a portion of the inputs.

18. The method of claim 17, wherein the interactive image control elements comprise interactive elements configured to control one or more styles for the image content, interactive elements configured to control a weight of the one or more styles for the image content, objects depicted within the image content, a weight of each object depicted within the image content, a term configuration element for controlling terms used to modify objects depicted within the image content, or a combination thereof.

19. The method of claim 13, further comprising:

analyzing the media content; and generating additional text content based on the analyzing.

20. The method of claim 19, wherein the additional text content comprises information associated with objects present in the media content, properties of the media content, or both.

21. A method comprising:

receiving, by one or more processors, input data via a content generation interface, wherein the input data comprises text content, media content, or both;

executing, by the one or more processors, one or more artificial intelligence algorithms against the input data to generate one or more pieces of candidate media content;

outputting, by the one or more processors, the one or more pieces of candidate media content to the content generation interface;

receiving, by the one or more processors, feedback associated with the one or more pieces of candidate media content via the content generation interface, wherein the executing and the outputting are performed in an iterative manner until a stop criterion is satisfied, and wherein additional candidate media content is generated during each iteration based on the feedback; and outputting, by the one or more processors, final media content subsequent to the stop criterion being satisfied.

22. The method of claim 21, further comprising:

presenting, via the content generation interface, interactive image configurator control elements for controlling generation of the one or more pieces of candidate and the additional media content; and receiving inputs via one or more of the interactive image configurator control elements, wherein the feedback is received via at least a portion of the inputs, and wherein the one or more artificial intelligence algorithms are configured to generate the additional candidate media content based on the feedback, and wherein particular additional media content generated during a particular iteration is different from other additional media content generated in a prior iteration based on the feedback.

23. The method of claim 22, wherein the input data comprises text content, and wherein the interactive image configuration control elements comprise control elements configured to modify the text content, wherein the modified text content configured to produce the additional candidate media content during execution of the one or more artificial intelligence algorithms in a subsequent iteration.

24. The method of claim 22, wherein the input data comprises media content, and wherein the interactive image configuration control elements comprise control elements configured to modify the media content, the modified media content configured to produce the additional candidate media content during execution of the one or more artificial intelligence algorithms in a subsequent iteration.

25. The method of claim 22, wherein the interactive image configurator control elements comprise interactive elements configured to control one or more styles for the image content, interactive elements configured to control a weight of the one or more styles for the image content, objects depicted within the image content, a weight of each object depicted within the image content, a term configuration element for controlling terms used to modify objects depicted within the image content, or a combination thereof.

26. The method of claim 21, further comprising:

outputting, to the content generation interface, the one or more candidate images generated for each iteration of the executing and the generating;

receiving, via inputs provided to the content generation interface, candidate image feedback based on the one or more candidate images, wherein additional candidate images are generated in a next iteration of the executing and the generating based at least in part on the candidate image feedback.

\* \* \* \* \*